United States Patent
Jeong

(10) Patent No.: US 9,742,203 B2
(45) Date of Patent: Aug. 22, 2017

(54) DISTRIBUTED RESONATORS FOR WIRELESS POWER TRANSFER

(71) Applicant: QUALCOMM Incorporated, San Diego, CA (US)

(72) Inventor: Seong Heon Jeong, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 192 days.

(21) Appl. No.: 14/630,996

(22) Filed: Feb. 25, 2015

(65) Prior Publication Data

US 2016/0111887 A1    Apr. 21, 2016

Related U.S. Application Data

(60) Provisional application No. 62/065,918, filed on Oct. 20, 2014.

(51) Int. Cl.
| | |
|---|---|
| *H01F 27/42* | (2006.01) |
| *H02J 5/00* | (2016.01) |
| *H02J 7/02* | (2016.01) |
| *H02J 7/00* | (2006.01) |
| *H02J 50/12* | (2016.01) |
| *H04B 5/00* | (2006.01) |

(52) U.S. Cl.
CPC ............ *H02J 5/005* (2013.01); *H02J 7/0042* (2013.01); *H02J 7/025* (2013.01); *H02J 50/12* (2016.02); *H04B 5/0037* (2013.01); *H04B 5/0075* (2013.01)

(58) Field of Classification Search
CPC ..... H04B 5/0037; H04B 5/0075; H02J 7/025; H02J 50/12; H02J 5/005; H02J 7/0042

USPC ........................................................ 307/104
See application file for complete search history.

(56) References Cited

U.S. PATENT DOCUMENTS

| | | | |
|---|---|---|---|
| 8,922,438 B2 | 12/2014 | Nakano | |
| 2008/0298100 A1 | 12/2008 | Esaka et al. | |
| 2011/0266882 A1 | 11/2011 | Yamamoto et al. | |
| 2012/0217818 A1 | 8/2012 | Yerazunis et al. | |
| 2012/0306282 A1 | 12/2012 | Tan et al. | |
| 2013/0043734 A1* | 2/2013 | Stone | H04B 5/0037 307/104 |
| 2014/0232330 A1 | 8/2014 | Robertson et al. | |
| 2015/0028803 A1* | 1/2015 | Shevde | H02J 7/025 320/108 |

(Continued)

FOREIGN PATENT DOCUMENTS

EP        2752958 A2        7/2014

OTHER PUBLICATIONS

International Search Report and Written Opinion—PCT/US2015/053501—ISA/EPO—Dec. 11, 2015.

(Continued)

*Primary Examiner* — Jared Fureman
*Assistant Examiner* — Duc M Pham

(57) ABSTRACT

An apparatus for wireless charging may include a casing for housing an electronic device and a plurality of power receiving elements that can couple to an externally generated magnetic field to wirelessly power or charge a load in the electronic device. At least one of the power receiving elements may comprise an electrically conductive segment of the casing.

41 Claims, 18 Drawing Sheets

(56) References Cited

U.S. PATENT DOCUMENTS

2015/0381239 A1* 12/2015 Shostak ............... H04B 5/0037
455/41.1

OTHER PUBLICATIONS

International Preliminary Report on Patentability—PCT/US2015/053501—International Bureau of WIPO—Geneva, Switzerland—dated May 4, 2017—7 pgs.

* cited by examiner

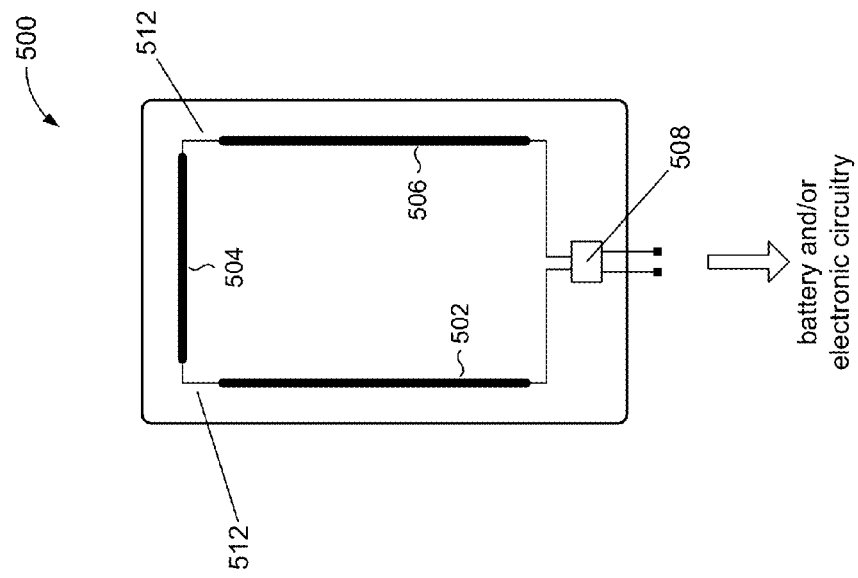
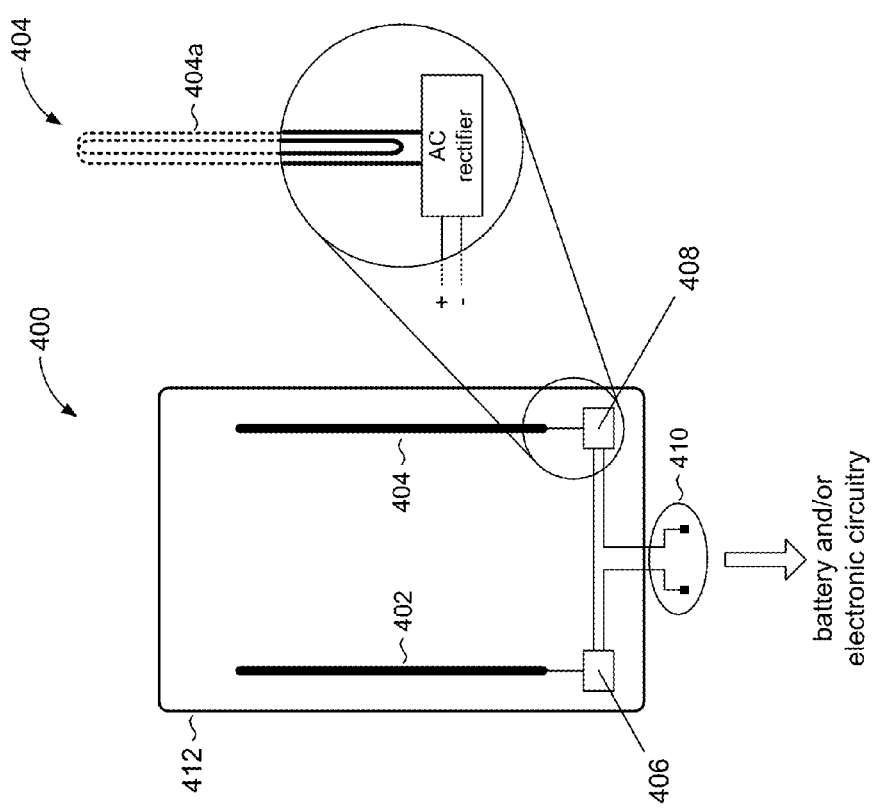

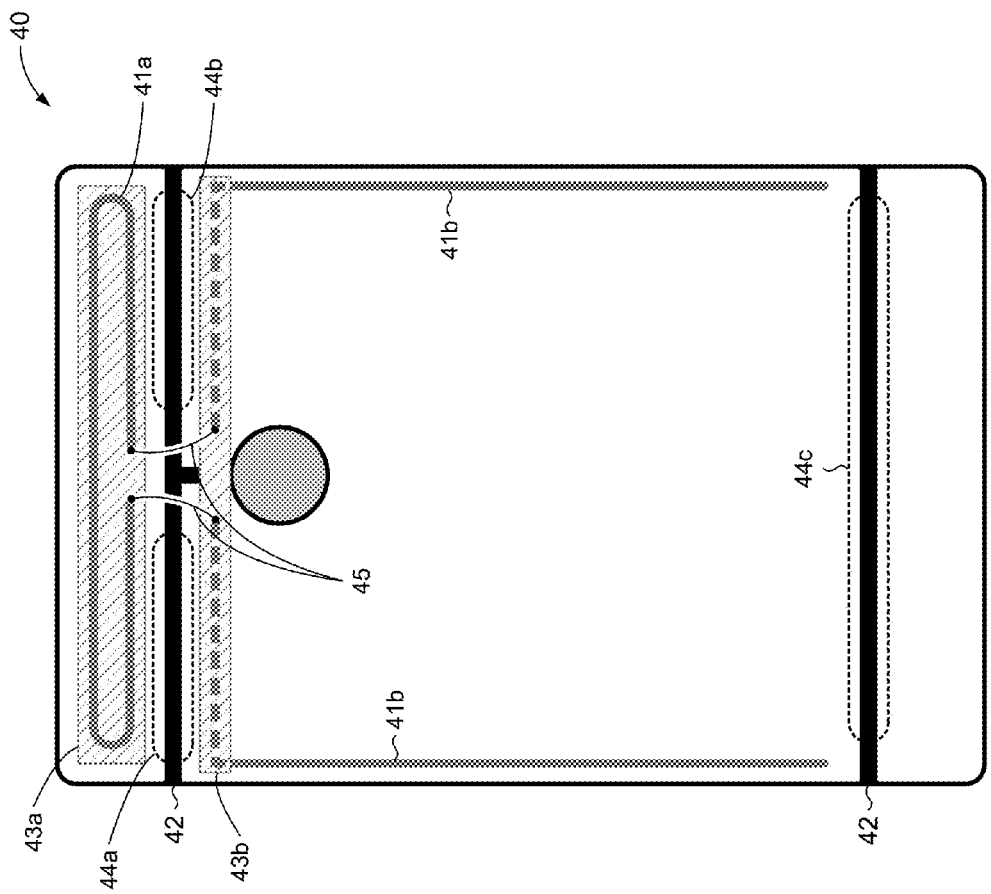

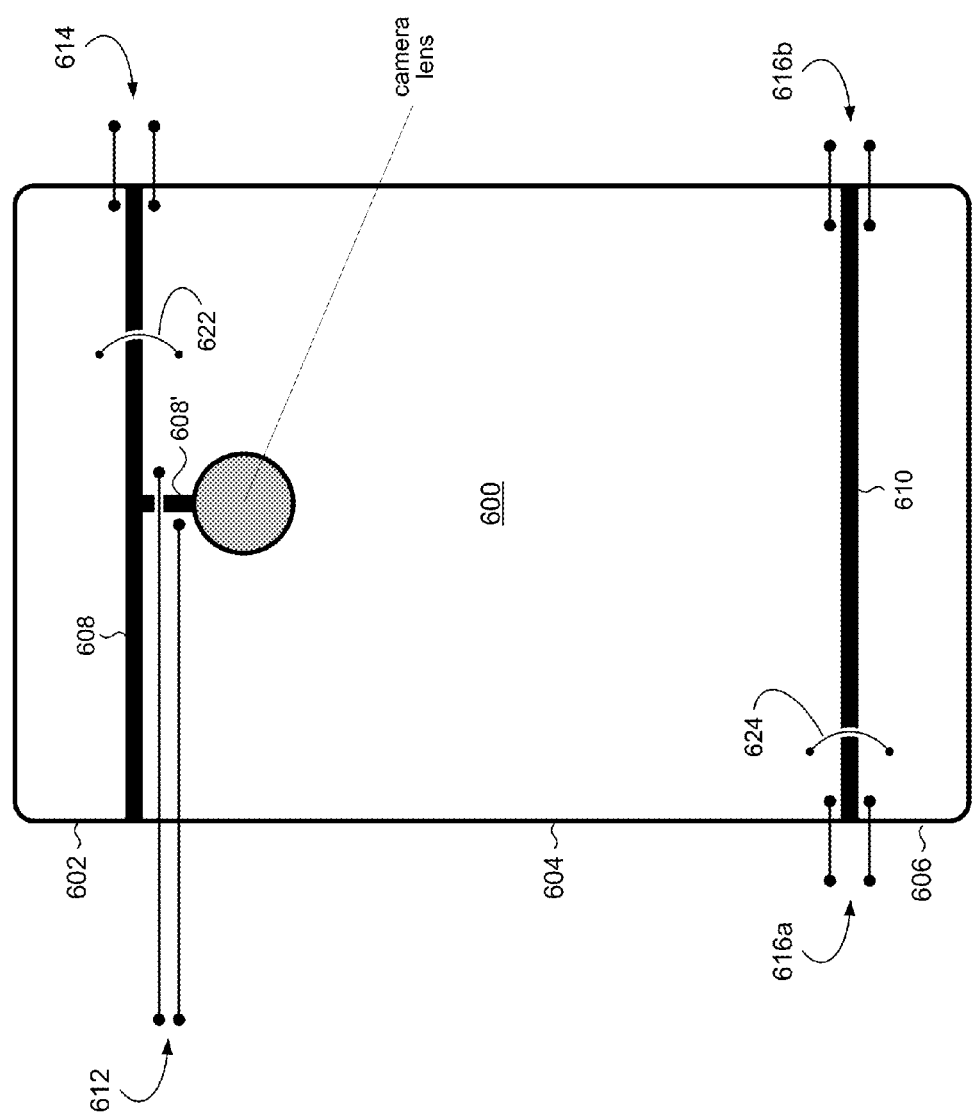

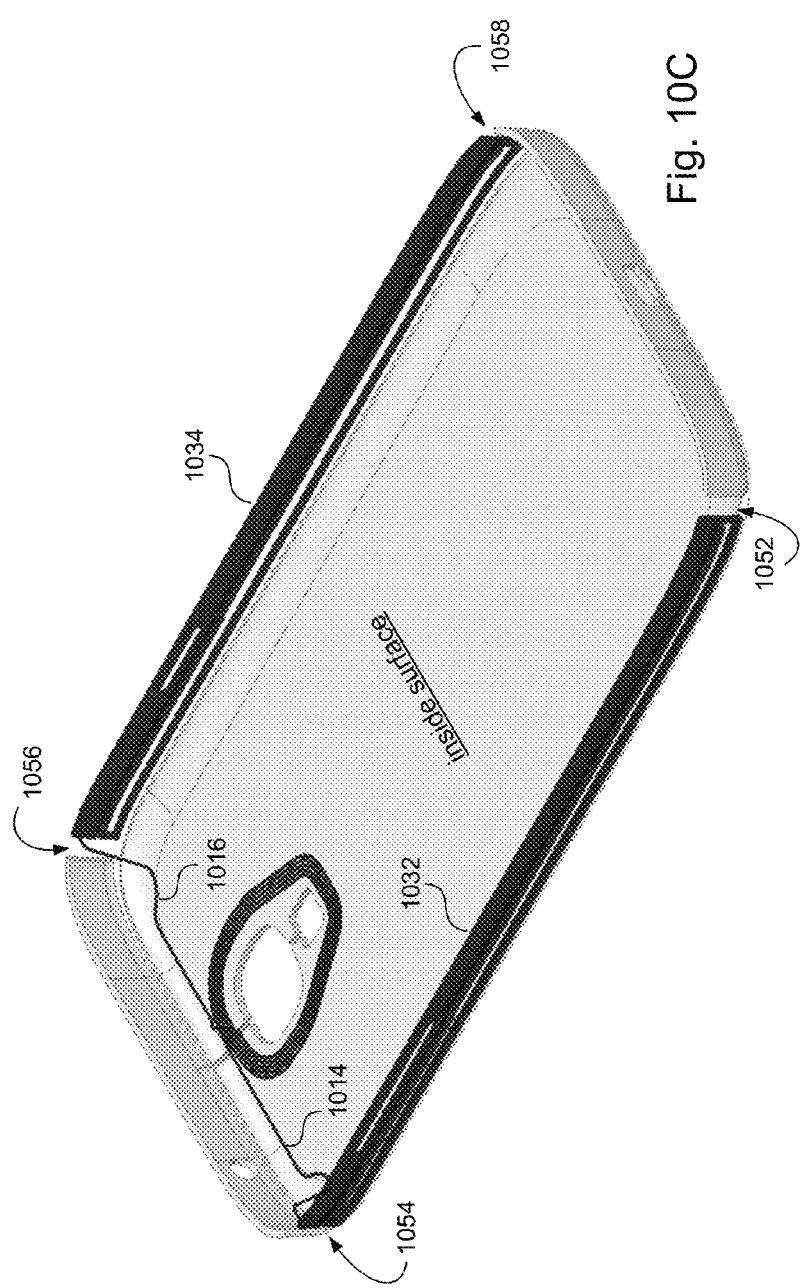
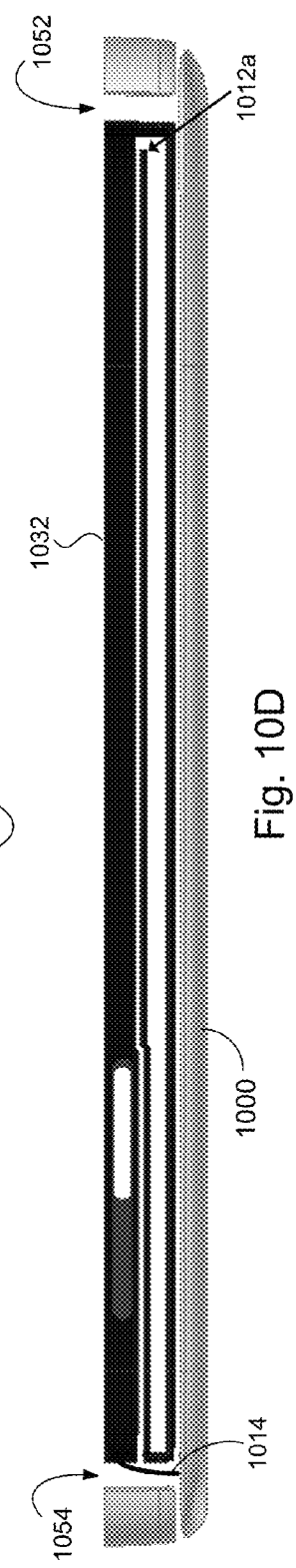
Fig. 10C
Fig. 10D

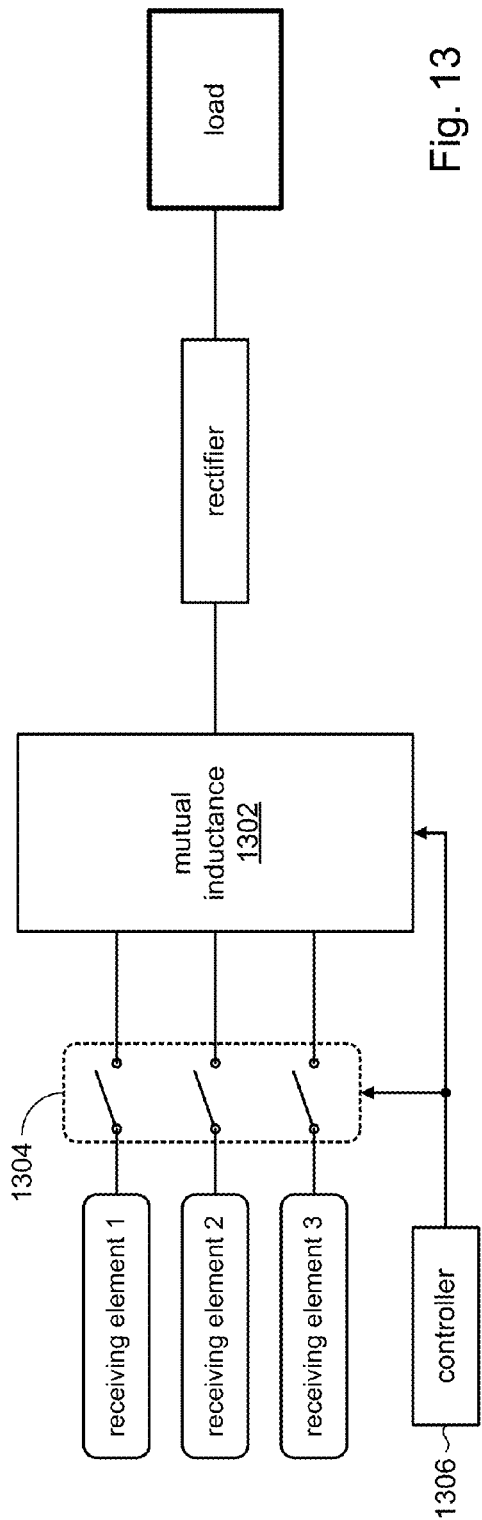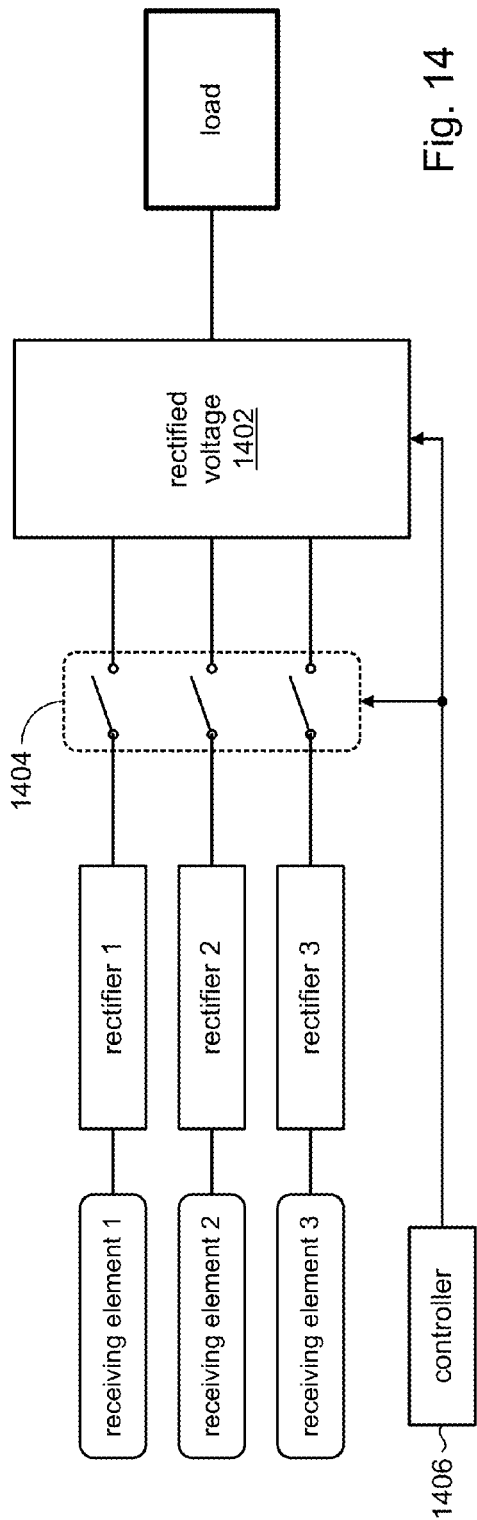

DISTRIBUTED RESONATORS FOR WIRELESS POWER TRANSFER

CROSS REFERENCE TO RELATED APPLICATIONS

Pursuant to 35 U.S.C. §119(e), this application is entitled to and claims the benefit of the filing date of U.S. Provisional App. No. 62/065,918 filed Oct. 20, 2014, the content of which is incorporated herein by reference in its entirety for all purposes.

TECHNICAL FIELD

The present disclosure relates generally to wireless power transfer systems. More particularly, the present disclosure relates to electronic devices having configurations of distributed power receiving elements for wireless power transfer.

BACKGROUND

Unless otherwise indicated, the foregoing is not admitted to be prior art to the claims recited herein and should not be construed as such.

Providing an adequate resonator in a power receiving unit (PRU) of a wireless charging system in an electronic device can be challenging. For example, in a mobile device, restrictions on how the back cover of the mobile device may be used can create challenges for the design and placement of a resonator for wireless charging. Manufacturers of mobile devices may specify "keep out" areas on their device designs in order not to impact performance of the antenna system that provide communication for the mobile device. Consequently, only small areas may be available for a wireless charging resonator so the resonator may be too small to generate adequate power for the mobile device.

The form factor of the electronic device itself may pose challenges in terms of its three dimensional structure. For example, the shape of the electronic device may not allow for practical placement of a resonator. The electronic device may be too small to support a resonator. In some instances, the electronic device may be made of a conductive medium where wireless power transfer is difficult.

SUMMARY

The present disclosure describes apparatus for wireless charging including a casing that comprises one or more electrically separate, electrically conductive segments. The apparatus may include power receiving elements configured to couple to an externally generated magnetic field to wirelessly power or charge a load. In accordance with aspects of the present disclosure, at least one of the power receiving elements may be an electrically conductive segment of the casing. In accordance with aspects of the present disclosure, a first power receiving element and a second power receiving element may be connected together.

In accordance with aspects of the present disclosure, one of the power receiving elements may be a coil of wire.

In accordance with aspects of the present disclosure, the apparatus may include switches to selectively connect together the power receiving elements in different combinations. In some aspects, the different combinations may exhibit different degrees of mutual coupling with the externally generated magnetic field. In some aspects, the different combinations may exhibit different output voltages. In some aspects, the different combinations may exhibit different resistances.

In accordance with aspects of the present disclosure, the externally generated magnetic field may be generated from a source that is vertically spaced apart from the apparatus. In accordance with aspects of the present disclosure, the externally generated magnetic field may generated from a source that is horizontally spaced apart from the apparatus.

The present disclosure describes apparatus for wirelessly receiving power, including a casing that constitutes a portion of a housing of an electronic device. The apparatus may include a first power receiving element configured to wirelessly receive power via an externally generated alternating magnetic field. In accordance with aspects of the present disclosure, the first power receiving element may be a coil of conductive material attached to the casing. The apparatus may include a second power receiving element configured to wirelessly receive power via the externally generated alternating magnetic field. In accordance with aspects of the present disclosure, the second power receiving element may be an electrically conductive segment comprising the casing.

In accordance with aspects of the present disclosure, the coil of conductive material that constitutes the first power receiving element may be electrically connected to the electrically conductive segment of the casing that constitutes the second power receiving element.

In accordance with aspects of the present disclosure, the apparatus may include a plurality of power receiving elements, including the first and second power receiving elements. The apparatus may include a plurality of switches operable to connect together different combinations of power receiving elements.

The present disclosure describes apparatus for wirelessly receiving power, comprising means for housing an electronic device, first means for receiving power through an externally generated magnetic field, and second means for receiving power through an externally generated magnetic field comprising a portion of the means for housing the electronic device.

The present disclosure describes a method for wirelessly receiving power, including producing a first current through electromagnetic induction at a first location in a device, producing a second current through electromagnetic induction at a second location in the device, and combining the first current and the second current to produce power for the device.

In accordance with aspects of the present disclosure, producing the first current may include coupling a first coil of wire to the externally generated magnetic field. In accordance with aspects of the present disclosure, producing the second current may include coupling a portion of a metallic casing that houses the device to the externally generated magnetic field.

The present disclosure describes an apparatus for wirelessly receiving power, including a casing for a power receiving unit (PRU) and power receiving elements distributed at different locations on the casing. The apparatus may include a combining circuit and switches to connect a subset of the power receiving elements to the combining circuit. The combining circuit may be configured to combine the subset of power receiving elements to form a set of connected power receiving elements. The apparatus may include a controller configured to operate the plurality of switches and the combining circuit.

In accordance with aspects of the present disclosure, the apparatus may include a rectifier circuit connected to an output of the combining circuit to produce an output voltage. In accordance with aspects of the present disclosure, the combining circuit may be configured to selectively connect together a subset of power receiving elements in series fashion and/or in parallel fashion.

In accordance with aspects of the present disclosure, apparatus may include rectifier circuits connected to respective power receiving elements to output respective DC levels. The outputs of the rectifier circuits may be connected to the combining circuit. In accordance with aspects of the present disclosure, the combining circuit may be configured to selectively add and/or subtract DC levels associated with the subset of power receiving elements.

The present disclosure describes an apparatus wirelessly receiving power, comprising means for housing a power receiving unit (PRU), a plurality of means for receiving power through an externally generated magnetic field, the plurality of means for receiving power distributed at different locations on the means for housing the PRU, and means for selectively combining a one or more of the plurality of means for receiving power to form a set of connected power receiving elements.

The present disclosure describes a method for wirelessly receiving power, including coupling power receiving elements to an externally generated magnetic field at different locations in a device, connecting together a subset of the receiving elements, and combining current induced in the subset of the receiving elements to produce power for the device. In accordance with aspects of the present disclosure, coupling power receiving elements to the externally generated magnetic field includes one or more of coupling a coil of wire to the externally generated magnetic field and coupling a portion of a metallic casing that houses the device to the externally generated magnetic field.

In accordance with aspects of the present disclosure, the method may include rectifying a combined current subsequent to combining the current induced in the subset of the power receiving elements. In accordance with aspects of the present disclosure, the method may include rectifying current induced in subset of the power receiving elements prior to the combining.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings:

FIG. 4 illustrates an embodiment of a system of distributed receiving elements in accordance with the present disclosure.

FIG. 4A shows a schematic representation of a casing in accordance with the present disclosure.

FIG. 5 illustrates an embodiment of distributed receiving elements in accordance with the present disclosure.

FIGS. 6 and 6A illustrate receiving elements using segments of a casing for a PRU.

FIGS. 7 and 7A-1 illustrate a configuration of receiving elements in accordance with the present disclosure.

FIGS. 9, 9A-1, 9A-2 illustrate configurations of receiving elements in accordance with the present disclosure.

FIGS. 10 and 10A-1 illustrate a configuration of receiving elements in accordance with the present disclosure.

FIGS. 10A, 10B, 10C, and 10D depict models of a casing configured with receiving elements in accordance with the present disclosure.

FIG. 13 illustrates selectively connectable combinations of receiving elements based on mutual inductance in accordance with the present disclosure.

FIG. 14 illustrates selectively connectable combinations of receiving elements based on voltage in accordance with the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

Figure 1:
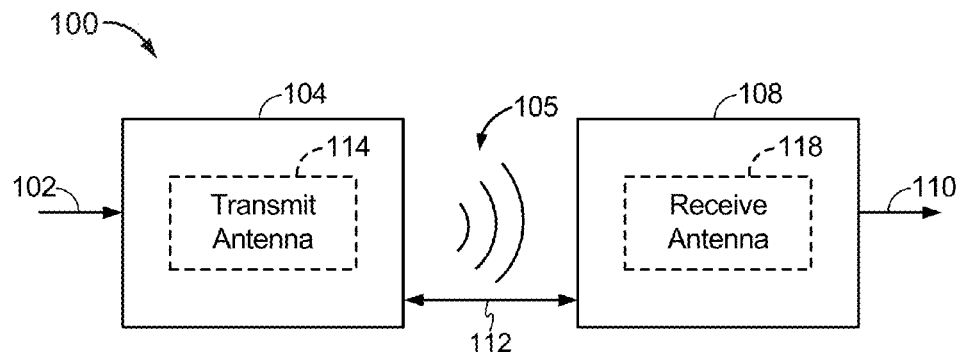
FIG. 1 is a functional block diagram of a wireless power transfer system in accordance with an illustrative embodiment.

FIG. 1 is a functional block diagram of a wireless power transfer system 100, in accordance with an illustrative embodiment. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element 114 for transmitting/coupling energy to the receiver 108. The receiver 108 may include a power receiving element 118 for receiving or capturing/coupling energy transmitted from the transmitter 104.

In one illustrative embodiment, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over a larger distances. Resonant inductive coupling techniques may thus allow for improved efficiency and power transfer over various distances and with a variety of inductive power transmitting and receiving element configurations.

In certain embodiments, the wireless field 105 may correspond to the "near field" of the transmitter 104 as will be further described below. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114.

In certain embodiments, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
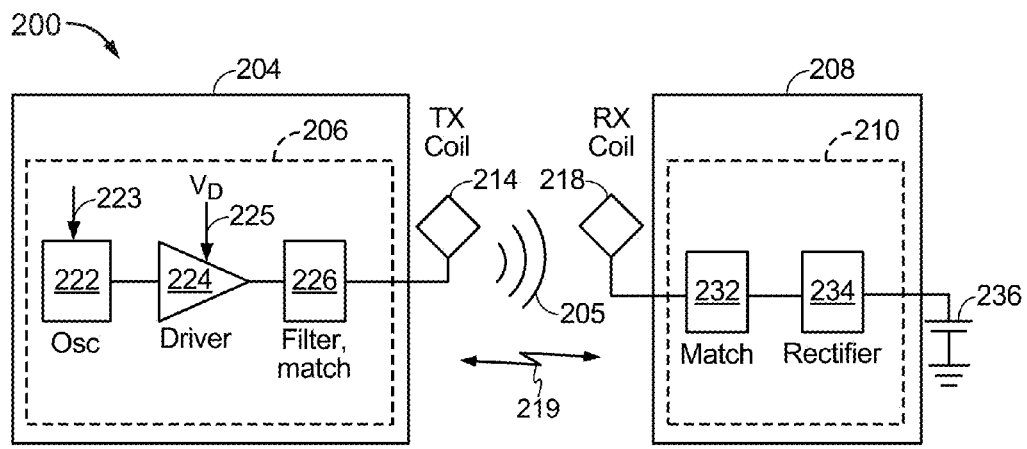
FIG. 2 is a functional block diagram of a wireless power transfer system in accordance with an illustrative embodiment.

FIG. 2 is a functional block diagram of a wireless power transfer system 200, in accordance with another illustrative embodiment. The system 200 may include a transmitter 204 and a receiver 208. The transmitter 204 (also referred to herein as power transfer unit, PTU) may include transmit circuitry 206 that may include an oscillator 222, a driver circuit 224, and a filter and matching circuit 226. The oscillator 222 may be configured to generate a signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output a sine wave.

The filter and matching circuit 226 may filter out harmonics or other unwanted frequencies and match the impedance of the transmitter 204 to the power transmitting element 214. As a result of driving the power transmitting element 214, the power transmitting element 214 may generate a wireless field 205 to wirelessly output power at a level sufficient for charging a battery 236, or otherwise powering a load.

The receiver 208 (also referred to herein as power receiving unit, PRU) may include receive circuitry 210 that may include a matching circuit 232 and a rectifier circuit 234. The matching circuit 232 may match the impedance of the receive circuitry 210 to the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. Transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

As discussed above, transmitter 204 and receiver 208 may be separated by a distance and may be configured according to a mutual resonant relationship to minimize transmission losses between the transmitter and the receiver.

Figure 3:
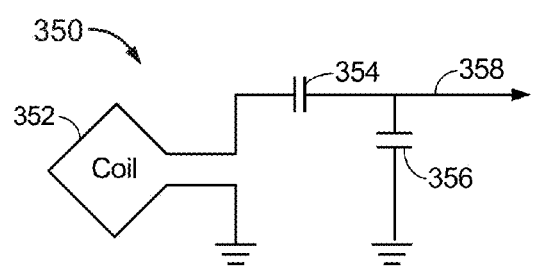
FIG. 3 is a schematic diagram of a portion of transmit circuitry or receive circuitry of FIG. 2 including a power transmitting or receiving element in accordance with an illustrative embodiment.

FIG. 3 is a schematic diagram of a portion of the transmit circuitry 206 or the receive circuitry 210 of FIG. 2, in accordance with illustrative embodiments. As illustrated in FIG. 3, transmit or receive circuitry 350 may include a power transmitting or receiving element 352. The power transmitting or receiving element 352 may also be referred to or be configured as an antenna or a "loop" antenna 352. The term "antenna" generally refers to a component that may wirelessly output or receive energy for coupling to another "antenna." The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator, the resonant frequency of the power transmitting or receiving element 352 may be based on the inductance and capacitance.

Inductance may be simply the inductance created by a coil or other inductor forming the power transmitting or receiving element 352, whereas, capacitance (e.g., a capacitor) may be added to create a resonant structure at a desired resonant frequency. As a non limiting example, a capacitor 354 and a capacitor 356 may be added to the transmit or receive circuitry 350 to create a resonant circuit.

Other resonant circuits formed using other components are also possible. As another non limiting example, a capacitor (not shown) may be placed in parallel between the two terminals of the circuitry 350. For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352.

Generally, in accordance with the present disclosure, the power receiving unit (PRU) of a wireless charging system may comprise several power receiving elements distributed at different locations in the PRU that can receive power through electromagnetic induction, for example, by coupling with an externally generated magnetic field. In some embodiments, the power receiving elements (referred to herein as "receiving elements") can individually produce power that can be combined to produce a single output of power. In other embodiments, some receiving elements may be connected together to produce power. A system of distributed receiving elements may be suitable for mobile devices where the space within such a device may not allow for a single receiving element of suitable size to provide adequate power transfer capacity.

In accordance with the present disclosure, receiving elements may comprise coils of wire (resonator coils) and/or segments of the housing of the electronic device. These aspects of the present disclosure will be discussed in more detail below. In some embodiments, the receiving elements may be connected in a resonant circuit to form a resonant power receiving element or "resonator"; see, for example, the circuit in FIG. 3. In other embodiments, the receiving elements may not be connected in a resonant circuit. In the figures and description that follow, it will be understood that the disclosed receiving elements may be connected in resonant circuits in some embodiments, and may not be connected in resonant circuits in other embodiments.

Referring to FIG. 4, a PRU 400 in accordance with some embodiments of the present disclosure may be configured with receiving elements 402, 404. Each receiving element 402, 404 may represent an example of means for receiving power through an externally generated magnetic field. In some embodiments, the receiving elements 402, 404 may comprise a coil of wire or other suitable electrically conductive medium. FIG. 4, for example, shows that receiving element 404 may comprise a coil of wire 404a having two turns. In some embodiments, the receiving elements 402, 404 may be connected in a resonant circuit. In other embodiments, the receiving elements 402, 404 may not be connected in a resonant circuit. Each receiving element 402, 404 may be connected to respective AC rectifier circuits 406, 408, which can convert a time-varying signal (AC signal) to a DC voltage. In some embodiments, the AC rectifier circuits 406, 408 may be full-wave rectifier circuits, or other suitable rectification circuits known to those of ordinary skill in the art. Output from the AC rectifiers 406, 408 may be connected in series to produce a single voltage at an output 410.

In some embodiments, the receiving elements 402, 404 may be attached to interior surfaces of the casing that houses the PRU 400. FIG. 4A, for example, is a schematic representation of a casing 40 that may be configured as means for housing a PRU (e.g., for a mobile computing device or any portable computing device) in accordance with the present disclosure. The figure shows examples of areas 44a, 44b, 44c in the PRU casing 40 that may incorporate communication antennas (not shown); e.g., cellular network, WiFi™ communication, Bluetooth communication, GPS, etc. The areas 44a, 44b, 44c may be referred to as "keep out" areas, because they should be free of obstructions that can impede proper signal transmission and/or reception through slots 42. FIG. 4A, for example, shows a receiving element 41a disposed above the keep out areas 44a, 44b and a receiving element 41b disposed below the keep out areas 44a, 44b. In some embodiments, the receiving elements 41a, 41b may be separate coils that are connected together, for example, by connecting wires 45 that run between the keep out areas 44a, 44b. In other embodiments all or a portion of metal segments of the casing may form a receiving elements (e.g., the receiving element 41a) as will be further described below.

Ferrite tape 43a, 43b (or any ferromagnetic material) may be provided between the receiving elements 41a, 41b and the metal shell that comprises the casing 40 to shield the metal shell from magnetic fields that can arise in the receiving elements 41a, 41b due to induced currents in receiving elements 41a, 41b during wireless power transfer. In some embodiments, ferrite tape 43b may also be provided on top of receiving element 41b to sandwich receiving element 41b. The upper ferrite tape 43b can shield nearby device electronics (not shown) that receiving element 41b may come into proximity with when the PRU is assembled.

Returning to FIG. 4, in operation, when a power transfer unit (PTU, not shown) generates an external time-varying magnetic field, the externally generated magnetic field can couple to receiving elements 402, 404 to induce an AC current in the receiving elements 402, 404. In particular, a first current can be produced through electromagnetic induction of receiving element 402 at a first location in PRU 400. A second current can be produced through electromagnetic induction of receiving element 404 at a second location in PRU 400. The AC rectifier circuits 406, 408 can rectify the AC currents that result in respective receiving elements 402, 404 to produce respective DC output voltages. The DC output voltages can then be combined to produce a voltage at output 410 to provide power to the PRU 400.

In some embodiments, the receiving elements may be on separate circuits. In FIG. 4, for example, each receiving element 402, 404 is shown connected to its respective AC rectifier circuit 406, 408. In other embodiments, the receiving elements may be connected together in series in a common circuit. Referring to FIG. 5, for example, a PRU 500 may comprise receiving elements 502, 504, 506. In some embodiments, each receiving element 502, 504, 506 may be a coil of wire having some number of turns, see for example the coil of wire 404a in FIG. 4. The separate coils of wire comprising the receiving elements 502, 504, 506 may be connected together in series by connectors 512. The connectors 512 may be wires, conductive traces on a printed circuit board (PCB), and so on. As indicated in FIG. 5, for example, one end of a coil comprising receiving element 502 may be connected to an AC rectifier 508. The other end of receiving element 502 may be connected to one end of a coil comprising receiving element 504. The other end of the coil for receiving element 504 may be connected to one end of a coil comprising receiving element 506. Finally, the other end of the coil comprising receiving element 506 may be connected to the AC rectifier 508.

In accordance with the present disclosure, at least some portions of the casing of the PRU itself can serve as receiving elements, if those portions of the casing are electrically conductive. FIG. 6, for example, illustrates a casing 600 that may be configured as means for housing a device (not shown) such as a smartphone, a computer tablet, etc. The casing 600, for example, may be the back cover of the device. In some embodiments, the casing 600 may comprise several electrically separate, electrically conductive segments 602, 604, 606. For example, segment 602 may be the upper portion of the casing 600, segment 604 may be the middle portion of the casing 600, and segment 606 may be the bottom portion of the casing 600. An electrically non-conductive separator 608 may provide electrical separation between the segments 602 and 604 to define a slot between segments 602 and 604. The non-conductive separator 608 may include a T-segment 608' that defines a slot in the segment 604. An electrically non-conductive separator 610 may provide electrical separation between the segments 604 and 606 to define a slot between segments 604 and 606.

In accordance with the present disclosure, the segments 602-606 may constitute inductive elements that can serve as receiving elements that receive power through electromagnetic induction, for example, by coupling to an externally generated magnetic field and thus give rise to eddy currents in the segments 602-606 which can be used to power a device (not shown). Each segment 602-606 may have a respective feed location for providing an output for the eddy currents. For example, feed location 612 may provide an output for eddy currents that can be induced in segment 604 during wireless power transfer. Segments 602-606 of casing 600 represent further examples of means for receiving power through an externally generated magnetic field In some embodiments, some of the segments may be connected together by connectors (jumper wires). For example, connector 622 may electrically connect together segment 602 and segment 604. A feed location 614 may provide an output for eddy currents that may arise in segments 602 and 604 in response to being coupled to an externally generated magnetic field. Similarly, a connector 624 may electrically connect together segment 604 and segment 606. A feed location 616a may provide an output for eddy currents that may arise in segments 604 and 606. In some embodiments, an additional feed location 616b may provide an additional output for eddy currents in segments 604 and 606.

Figure 6A:
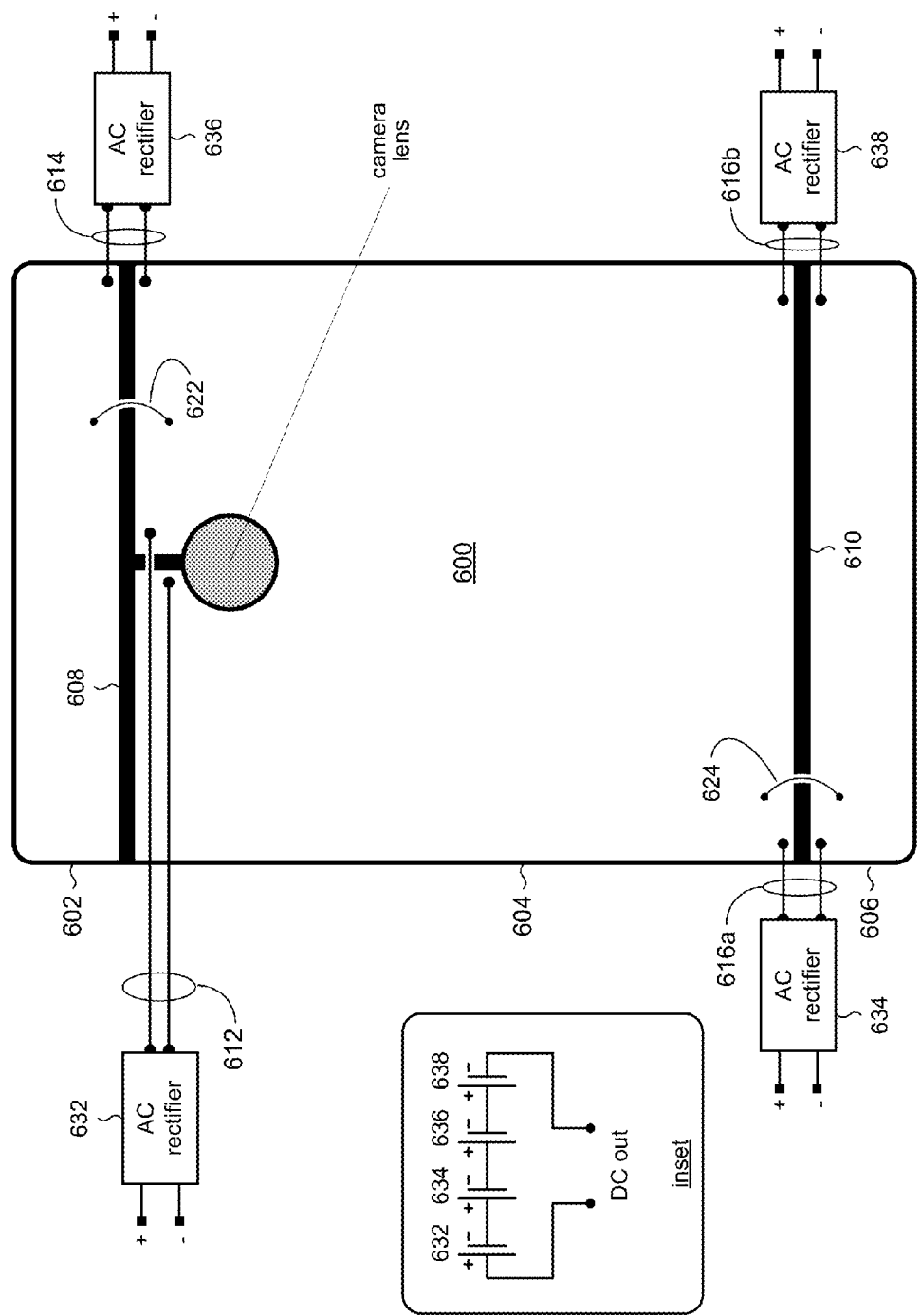

Referring to FIG. 6A, the feeds 612, 614, 616a, 616b may connect to respective AC rectifier circuitry 632, 634, 636, 638 to produce respective DC voltage levels. In some embodiments, the AC rectifier circuitry 632-638 may be part of the device electronics. Outputs of the AC rectifier circuitry 632-638 may be connected together in series to produce a single DC output, such as illustrated for example by the inset illustrated in FIG. 6A.

In accordance with the present disclosure, a system of receiving elements in a PRU may comprise coils (resonator coils) of conductive wire distributed at different locations in the PRU. FIG. 4, for instance, illustrates an example of a system of receiving elements comprising coils distributed at different locations on the casing of a PRU. In some embodiments, the system of receiving elements in a PRU may comprise segments of a metal casing. FIG. 6, for example, illustrates a system of receiving elements comprising electrically separate, electrically conductive segments of the casing of a PRU.

Figure 7:
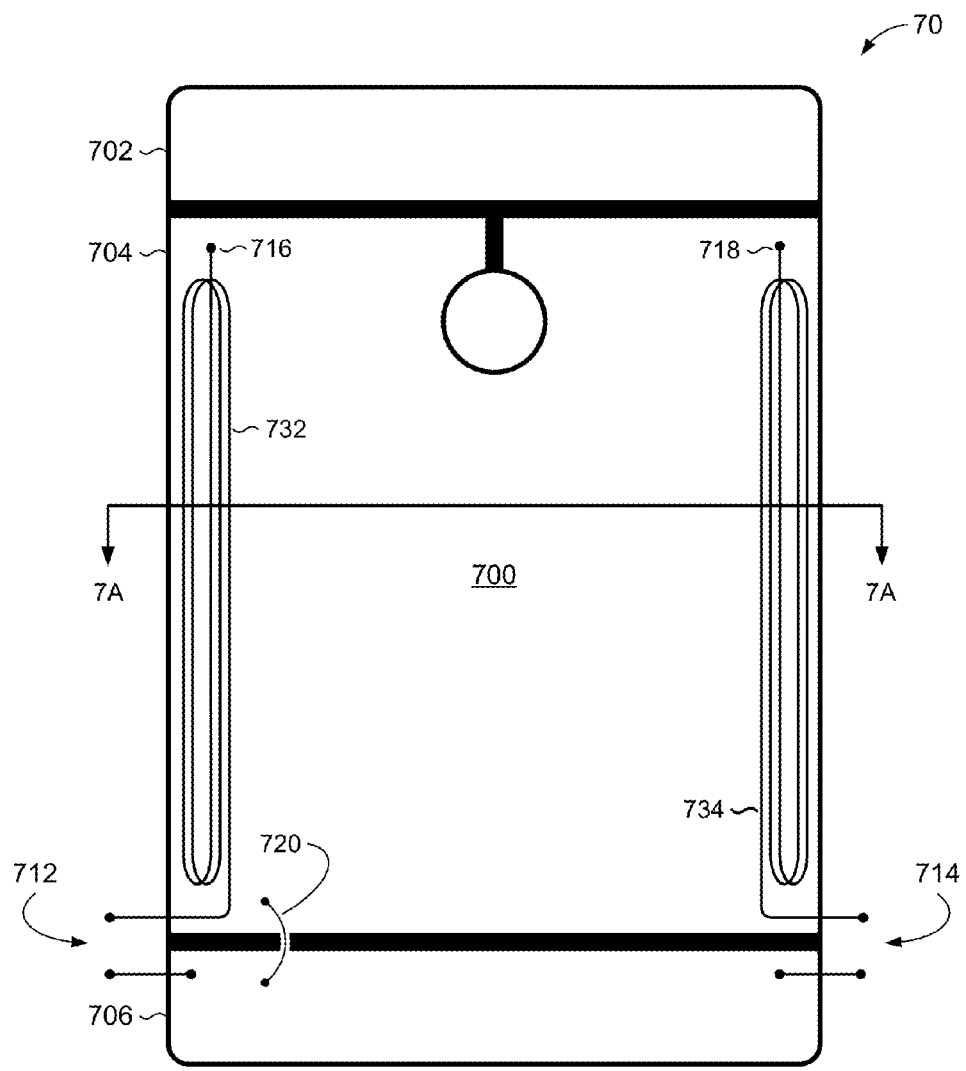

In some embodiments, the system of receiving elements in a PRU may comprise a combination of coils and segments of a casing of the PRU. FIG. 7, for example, shows in schematic fashion an embodiment of a casing 700 that may be configured as means for housing a PRU 70 in accordance with the present disclosure. The casing 700 may comprise electrically separate, electrically conductive segments 702, 704, 706. Receiving elements 732, 734 may be disposed on the side walls of the casing 700.

Figures 1, 7A:
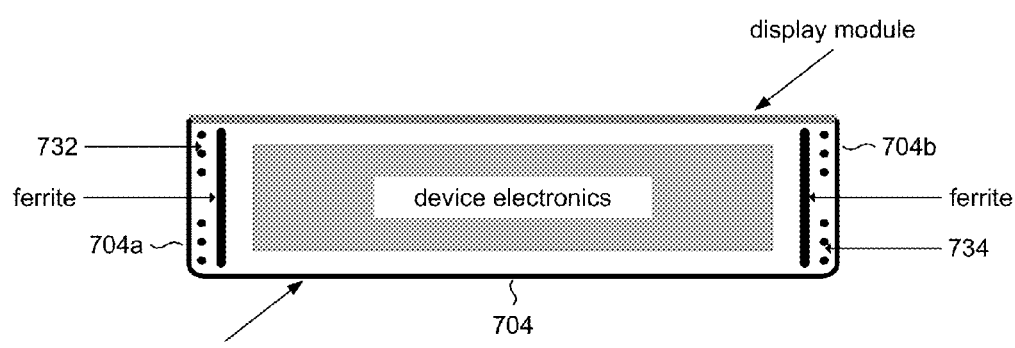

Referring for a moment to FIG. 7A-1, a cross-sectional view taken along view lines 7A-7A in FIG. 7 illustrates the sidewall arrangement of receiving elements 732, 734 in accordance with some embodiments. The receiving elements 732, 734 may comprise coils wound in the same direction or in different directions. In some embodiments, for example, the coil for receiving element 732 may be wound in one direction (e.g., clockwise), while the coil for receiving element 734 may be wound in the opposite direction (e.g., counterclockwise). In other embodiments, the coils for receiving elements 732, 734 may both be wound in the same direction. The number of turns (windings) in the coils for receiving elements 732, 732 can be any suitable number of turns. Merely to illustrate an example, the coils for receiving elements 732, 734 may each comprise 2.5 turns. The number of turns in any given implementation may depend on considerations such as desired mutual inductance, wire resistance, size of the coils, and so on.

In some embodiments, a ferrite tape or other ferromagnetic material may be disposed between the receiving elements 732, 734 and device electronics (e.g., PCB, battery, etc.) to shield the device electronics from the magnetic field that can radiate from the receiving elements 732, 734 during wireless power transfer. Ferrite material (not shown) may also be disposed between the receiving elements 732 734 and the metal casing 700. The receiving elements 732, 734 may be disposed on respective sidewalls 704a, 704b of segment 704. For example, in some embodiments, the receiving elements 732, 734 may be taped, glued, or otherwise secured in place against respective sidewalls 704a, 704b of segment 704.

Returning to FIG. 7, in accordance with some embodiments, receiving elements may be connected together by segments of the casing. In FIG. 7, for example, the receiving elements 732, 734 may be connected in series through segment 704 of casing 700. One end of receiving element 732 may be electrically connected to segment 704 at 716, and likewise one end of receiving element 734 may be electrically connected to segment 704 at 718.

In some embodiments, the system of receiving elements may include segments of the casing in addition to receiving elements such as 732, 734. For example, the segment 704 itself may serve as a receiving element in addition to providing the function of connecting together the receiving elements 732, 734. To further illustrate, FIG. 7 shows that segment 706 may itself serve as a receiving element in addition to the receiving elements 732, 734. A connector 720 may connect together segment 704 and segment 706.

Feeds may be provided at suitable locations to bring power out to device electronics (not shown). For example, feed 712 may include a terminal connected to one end of receiving element 732 and another terminal connected to segment 706. Likewise, feed 714 may include a terminal connected to one end of receiving element 734 and another terminal connected to segment 706. For example, feeds 712, 714 may connect to rectifier circuitry (not shown) to provide DC power to the PRU 70.

Figure 8:
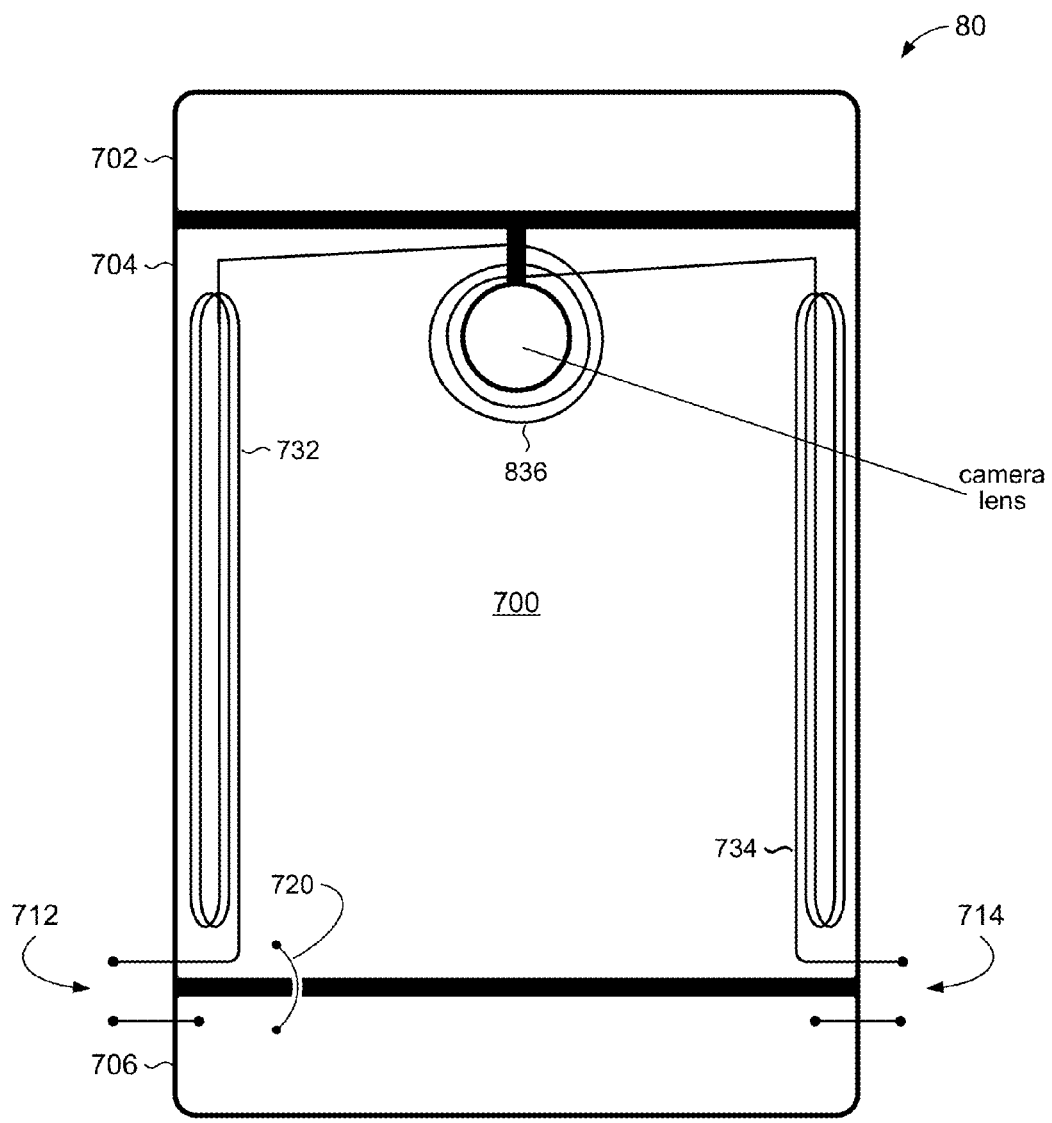
FIG. 8 illustrates a configuration of receiving elements in accordance with the present disclosure.

FIG. 7 demonstrates that in some embodiments, the receiving elements 732, 734 may be configured to couple directly to the externally generated magnetic field. In other embodiments, one or more receiving elements may be configured instead to couple to magnetic fields that can arise from eddy currents induced on a metal back cover of a PRU by the externally generated magnetic fields. Referring to FIG. 8, for example, in some embodiments a PRU 80 may include a receiving element 836 disposed about the camera lens opening formed through the segment 704 of casing 700. The receiving element 836 may be configured to couple to magnetic fields that can arise from eddy currents in segment 704 during wireless power transfer. The receiving elements 732, 734, 836 may be connected together in series to constructively combine individual magnetic fields that can arise due to induced currents in the receiving elements 732, 734, 836. It will be appreciated by those of ordinary skill that additional receiving elements can be provided. In some embodiments, ferrite tape or other ferromagnetic material (not shown) may be provided between receiving element 836 and device electronics in the PRU in order to shield the device electronics from magnetic fields that can arise due to currents induced in the receiving element 836 during wireless power transfer.

In some embodiments, the receiving elements 732, 734, 835 may be coils, having a suitable number of turns. Merely to illustrate an example, coils for receiving elements 732, 734 may each comprise 2.5 turns, and the coil for receiving element 836 may comprise 5 turns. The number of turns in any given implementation may depend on considerations such as desired mutual inductance, wire resistance, size of the coils, and so on.

In some embodiments, receiving elements may be disposed at different location on the inner surface of the casing of a PRU. For example, referring back to FIGS. 7 and 7A-1 for a moment, the receiving elements 732, 734 may be disposed on the inner surface of the casing 700 of PRU 70, or may be otherwise enclosed within the casing 700 when the PRU 70 is assembled. FIG. 7, for example, shows that receiving elements 732, 734 may be attached to the inside surfaces of segment 704 of casing 700. FIG. 7A-1 shows further that receiving elements 732, 734 may be enclosed within the casing 700 when the PRU 70 is assembled with the display module.

Figure 9:
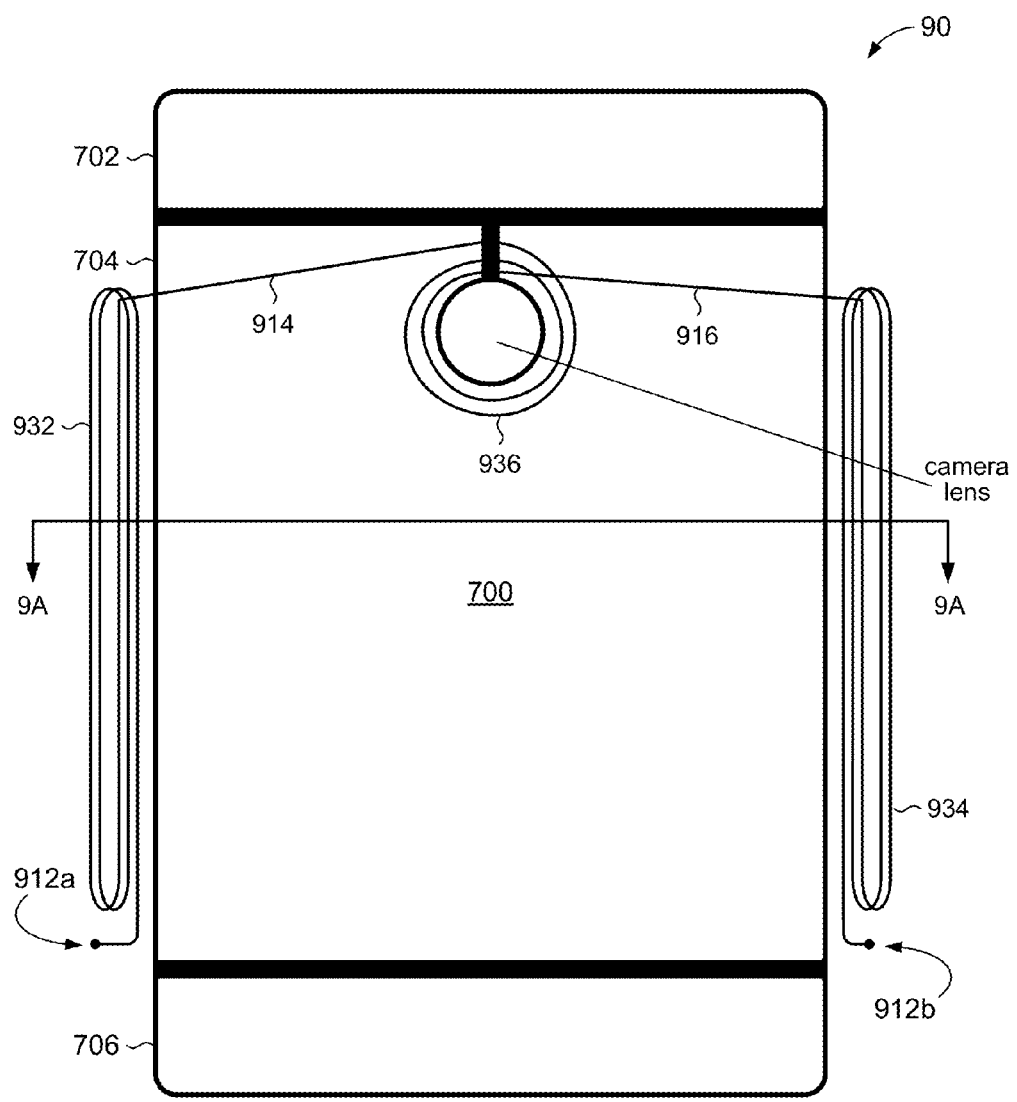

In other embodiments according to the present disclosure, some receiving elements of a PRU may be mounted or otherwise disposed exteriorly relative to portions the casing of the PRU. FIG. 9, for example, illustrates in schematic fashion an example of a PRU 90 having a system of receiving elements comprising separate differently located receiving elements 932, 934, 936 connected together in series; e.g., by connectors 914, 916. The receiving element 936 may be arranged or otherwise disposed on an interior surface of the casing 700 of PRU 90. The receiving elements 932, 934 may be disposed on an exterior surface of the PRU 90 and not on an interior surface of the casing 700. Feeds 912a, 912b may bring power out to device electronics (not shown) of PRU 90. For example, feeds 912a, 912b may connect to rectifier circuitry (not shown) to provide DC power to PRU 90.

Figures 1, 9A:
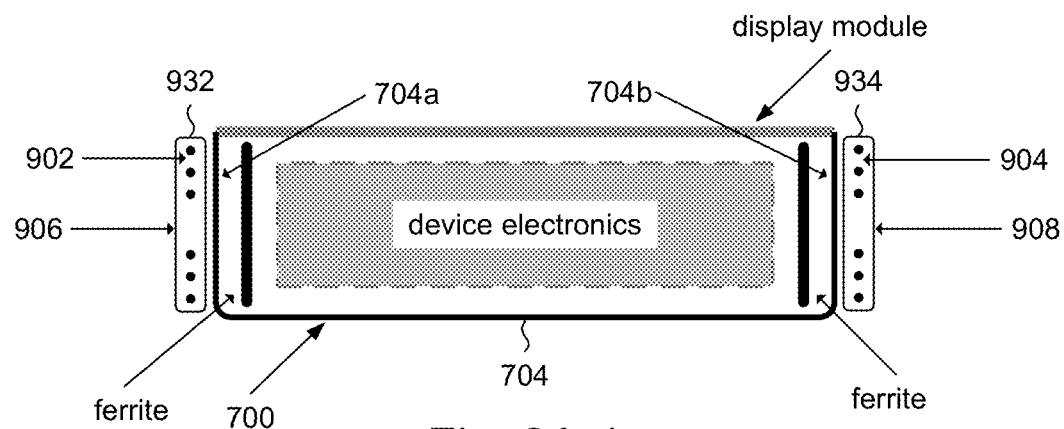
Figures 2, 9A:
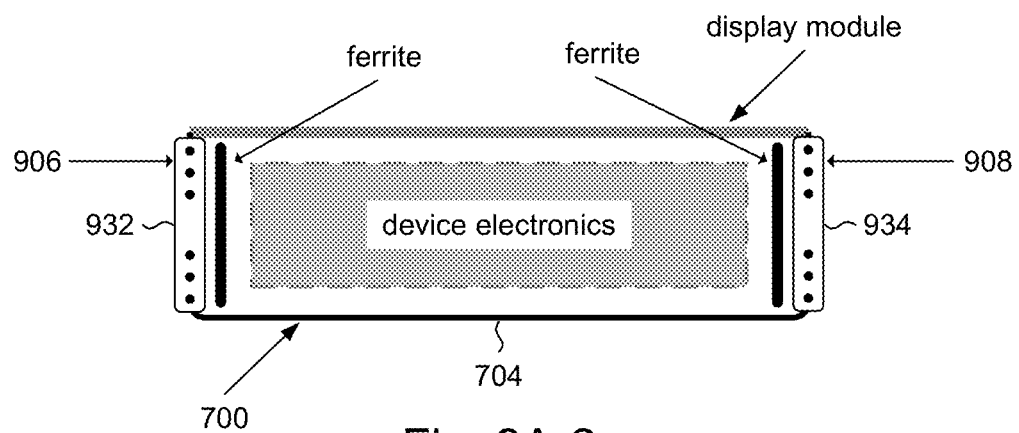

Referring for a moment to FIG. 9A-1, a cross-sectional view taken along view lines 9A-9A in FIG. 9 illustrates the sidewall arrangement of receiving elements 932, 934 in accordance with some embodiments. FIG. 9A-1 more clearly illustrates that in some embodiments, receiving elements 932, 934 may be disposed on outer surfaces of the sidewalls 704a, 704b of casing 700. In some embodiments, receiving elements 932, 934 may comprise respective coils (loops) of conductive material (e.g., wire) 902, 904 supported on respective substrates 906, 908. Substrates 906, 908, for example, may be plastic or other non-conductive material. In some embodiments, the coils for receiving elements 902, 904 may be molded into respective substrates 906, 908, using an injection molding technique for example. In other embodiments, the coils for receiving elements 902, 904 may be otherwise embedded into respective substrates 906, 908, for example, by carving out cavities in the substrates 906, 908 and positioning the coils for receiving elements 902, 904 within the cavities. In other embodiments, the coils for receiving elements 902, 904 may be formed on flexible printed circuit boards (PCB) that are attached (e.g., glued, taped, etc.) to respective substrates 906, 908, rather than being embedded within the substrate 906, 908.

As illustrated in FIG. 9A-1, in some embodiments the receiving elements 932, 934 may be attached to respective sidewalls 704a, 704b of the casing 700. In other embodiments, the receiving elements themselves may form the sidewalls of the casing for a PRU. For example, the cross-sectional view in FIG. 9A-2 illustrates an embodiment in which the metal sidewall portions (e.g., 704a, 704b, FIG. 9A-1) of casing 700 may be replaced by the receiving elements 932, 934. The substrate material of substrates 906, 908 can be selected to provide sufficient structural support to serve as the sidewalls of casing 700.

Figure 10:
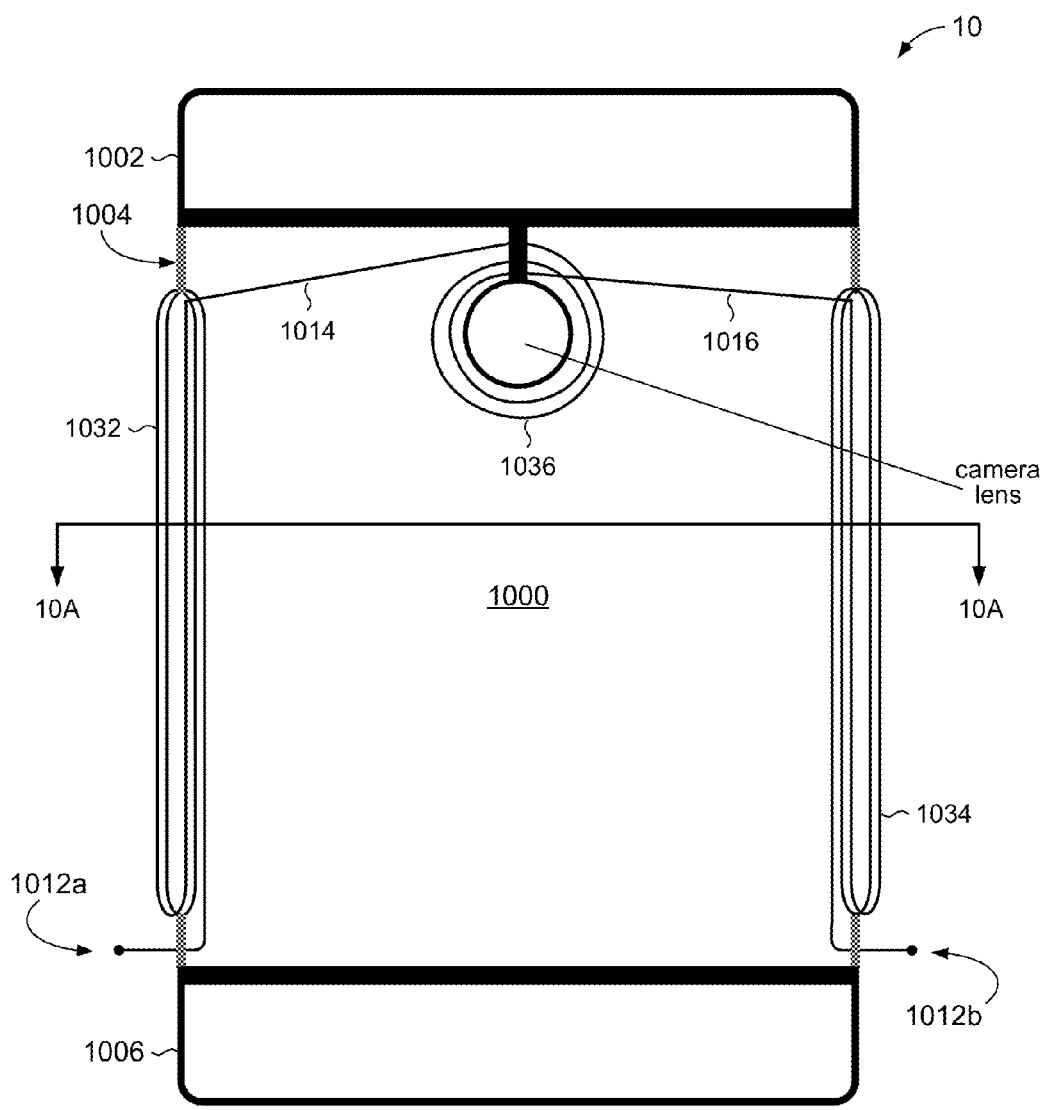

In some embodiments, the conductive casing of the PRU itself may be machined to define one or more separately located receiving elements. Referring to FIG. 10, in some embodiments, a casing 1000 for a PRU 10 may comprise electrically separate, electrically conductive segments 1002, 1004, 1006. In some embodiments, the sidewalls of segment 1004 may comprise receiving elements 1032, 1034. For example, the receiving elements 1032, 1034 may comprise coiled structures machined from the same material used for the casing 1000. Each of the sidewalls of segment 1004 may include a non-conductive frame to support the coiled structure and to attach the coiled structure to the segment 1004. These structures will be discussed below.

In accordance with the present disclosure, the receiving elements 1032, 1034 are not internal to or otherwise enclosed by the casing 1000, and are external. In some embodiments, a receiving element 1036 may be disposed on an interior surface of the casing; e.g., segment 1004. The receiving elements 1032, 1034 may be configured to couple directly to an externally generated magnetic field during wireless power transfer, while the receiving element 1036 may be configured to couple to eddy currents induced in segment 1004 by the externally generated magnetic field. The receiving elements 1032, 1034, 1036 may be connected together in series by connectors 1014, 1016. In some embodiments, the winding directions (e.g., clockwise or counterclockwise) of the receiving elements 1032, 1034, 1036 may chosen to constructively combine the magnetic fields that can arise due to currents induced in each of the receiving element 1032, 1034, 1036 during wireless power transfer.

Feeds 1012a, 1012b may be provided to bring power out to device electronics (not shown). In some embodiments, for example, feeds 1012a, 1012b may connect to rectifier circuitry (not shown) to provide DC power to the PRU 70.

Figures 1, 10A:
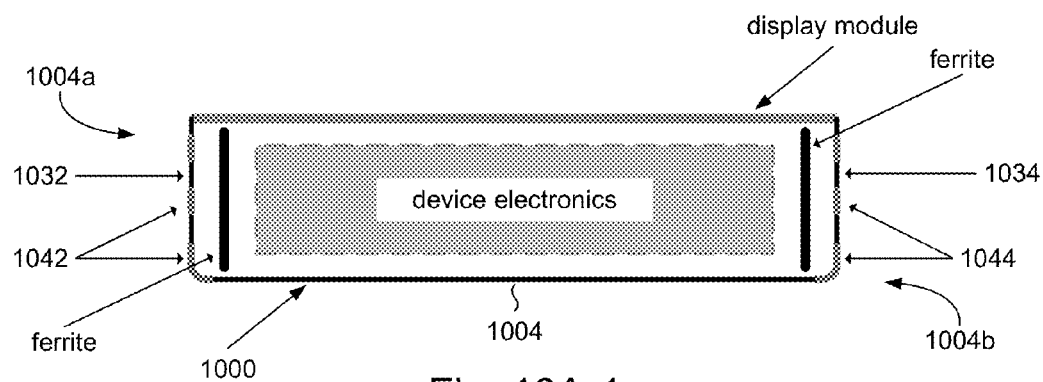

FIG. 10A-1 shows a cross-sectional view taken along view lines 10A-10A in FIG. 10. The figure illustrates an embodiment of sidewall construction of casing 1000 in accordance with the present disclosure. In some embodiments, the sidewall 1004a of segment 1004 may comprise a coiled structure that constitutes receiving element 1032. In some embodiments, the coiled structure may be machined from the same metal as the casing 1000. In other embodiments, the coiled structure may be machined from a material different from the casing. The choice of material may be determined, for example, as a matter of aesthetics.

The sidewall 1004a may further comprise an electrically non-conductive frame 1042 that provides structural support for the coiled structure of the receiving element 1032. In addition, the frame 1042 may be configured to allow the combined structure 1032/1042 to be connected to the casing 1000 to define sidewall 1004a. The frame 1042 may also serve to electrically isolate the receiving element 1032 from the casing 1000.

The sidewall 1004b may be likewise constructed, comprising a coiled structure that constitutes receiving element 1034 and a frame 1044. The frame 1044 may be configured to support the coiled structure that constitutes receiving element 1034 and to connect the combined structure 1034/1044 to the casing 1000 to define sidewall 1004b. The frame 1044 may also serve to electrically isolate the receiving element 1034 from the casing 1000.

Figures 10A, 10B:

FIGS. 10A and 10B illustrate top views of a model of the case 1000. FIG. 10A shows a top view looking into the inside surface of case 1000. FIG. 10B shows a top view looking at the outside surface of case 1000. The figures illustrate that receiving elements 1032, 1034 may define sidewalls for casing 1000. A frame (not shown) may support each receiving element 1032, 1034. As explained above, the frame can electrically isolate each receiving element 1032, 1034, for example, by providing spacing between the receiving element 1032, 1034 and the casing 1000. Examples are shown at 1052, 1054, 1056, 1058. See also, the perspective view of casing 1000 shown in FIG. 10C.

The side view of casing 1000 shown in FIG. 10D shows an example of the coiled structure that comprises receiving element 1032. In the example depicted in the figure, the coiled structure has 1.5 turns, although in other embodiments, the coiled structure may have a different number of turns. The feed 1012a may be at one end of the coiled structure. The connector 1014 may be connected to the other end of the coiled structure.

Figure 11A:
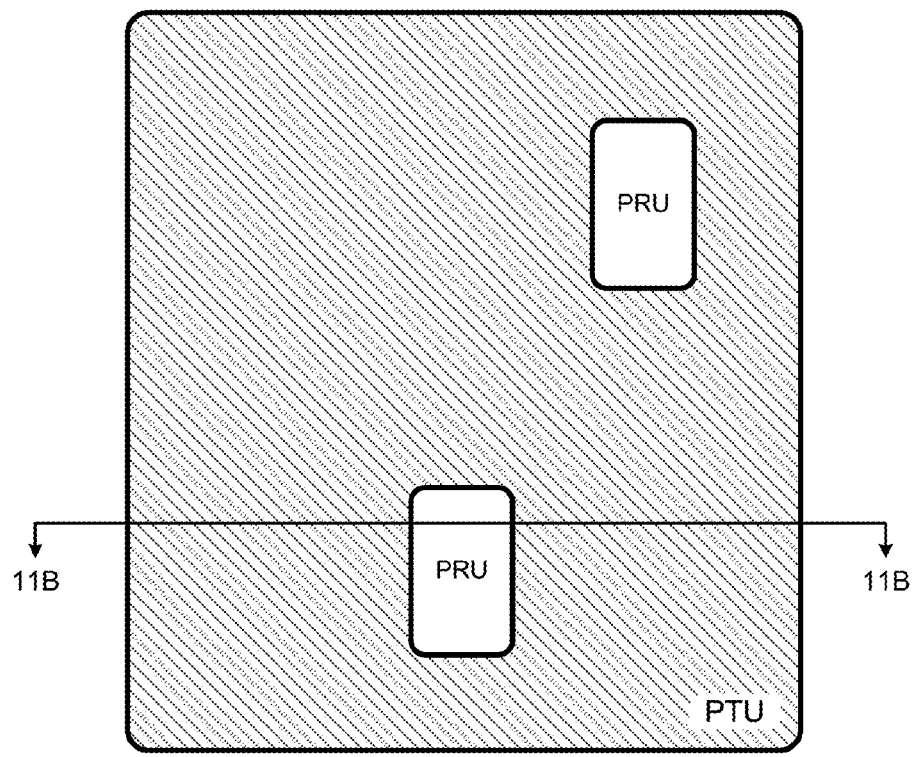
FIGS. 11A and 11B illustrate a vertical configuration of a PTU and PRU in accordance with the present disclosure.
Figure 11B:
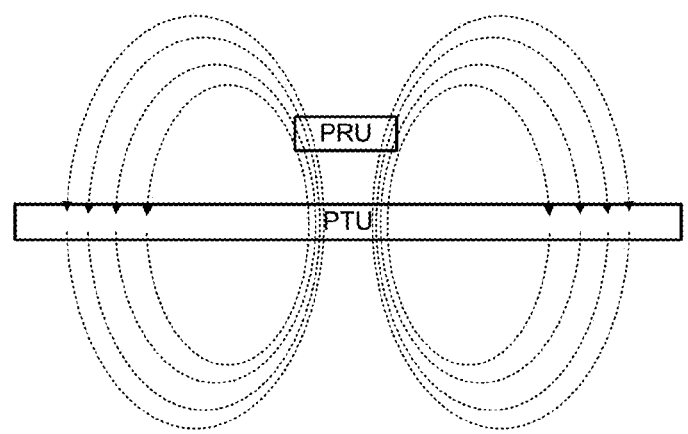

In some embodiments, a PRU in accordance with the present disclosure may be arranged in vertical relation with respect to the power transfer unit (PTU). In other words, in some embodiments, the PRU and PTU may be vertically spaced apart. Referring to FIG. 11A, for example, a top view looking onto a PTU charging surface shows two PRU's placed on the charging surface. FIG. 11B shows a cross-sectional view taken along view lines 11B-11B, illustrating that PRU can be vertically spaced apart from the PTU, showing a magnetic field generated by the PTU.

Figure 11C:
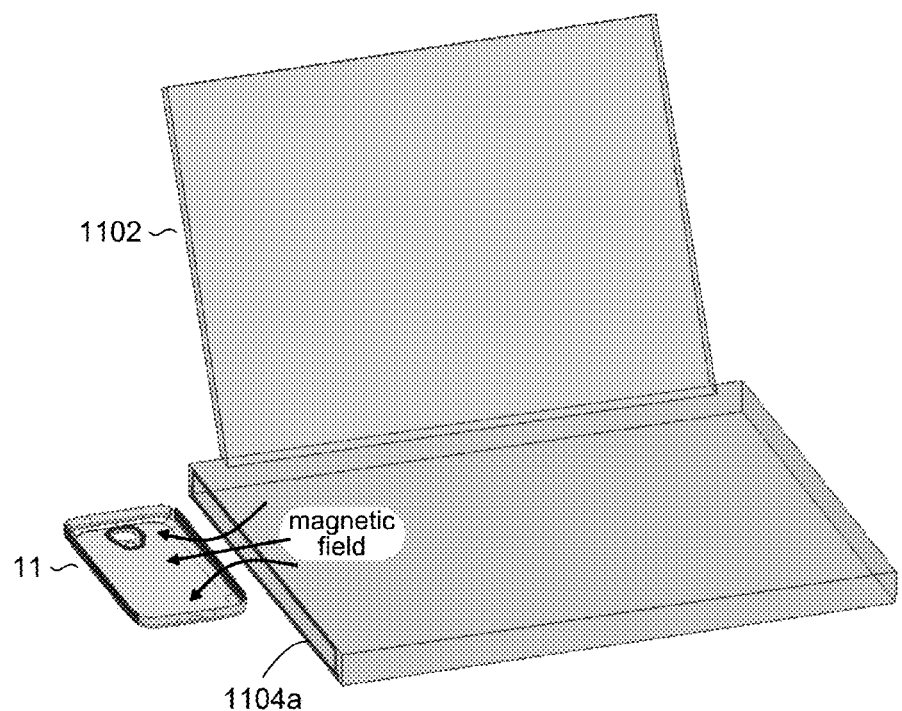
FIGS. 11C and 11D illustrate side-by-side configurations of a PTU and PRU in accordance with the present disclosure.

In some embodiments, a PRU in accordance with the present disclosure may be arranged in side-by-side configuration with respect to the power transfer unit (PTU). In other words, in some embodiments, the PRU and PTU may be horizontally spaced apart. Referring to FIG. 11C, for example, the PTU 1102 may be an electronic device such as a laptop computer, or other such device that can be configured to serve as a PTU to provide wireless power to PRU 11. The PTU 1102 may include a transmit coil 1104a. In some embodiments, the transmit coil 1104a may be arranged on a sidewall of a casing of the PTU 1102. In particular, the transmit coils 1104a may be wound in a plane parallel to the winding of a coil comprising the receiving element of PRU 11. FIG. 11C shows the orientation of the magnetic field lines that can arise during a wireless power transfer operation.

Figure 11D:
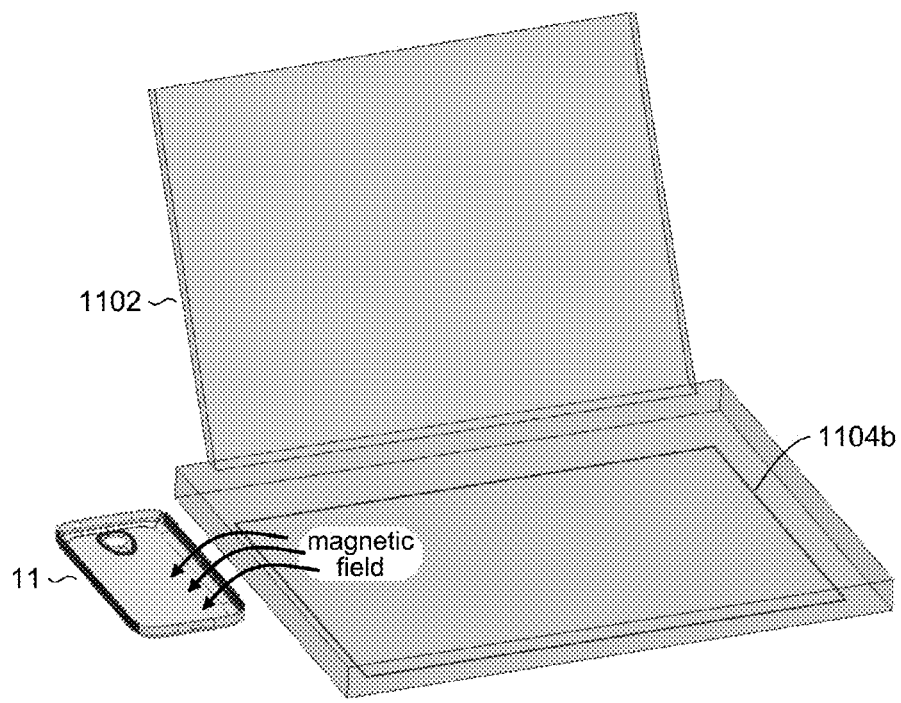

FIG. 11D illustrates, in some embodiments, that PTU 1102 may have a transmit coil 1104b wound in a plane that is not parallel to the winding of a coil comprising the receiving element of PRU 11. For example, the transmit coil 1104b may be disposed on the bottom of the casing of the PTU 1102. FIG. 11D illustrates an example of the orientation of the magnetic field lines that can arise during a wireless power transfer operation in such a configuration.

Figure 12C:
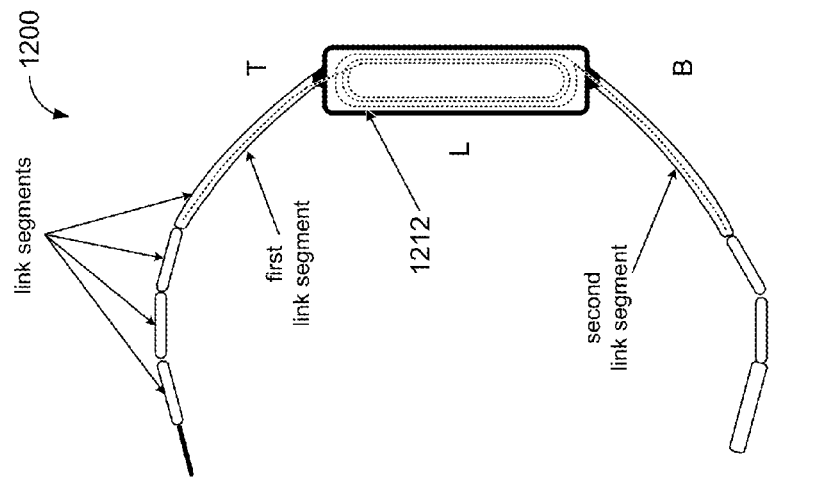
FIGS. 12A, 12B, and 12C illustrate aspects of a system of receiving elements in a wearable device in accordance with the present disclosure.
Figure 12A:
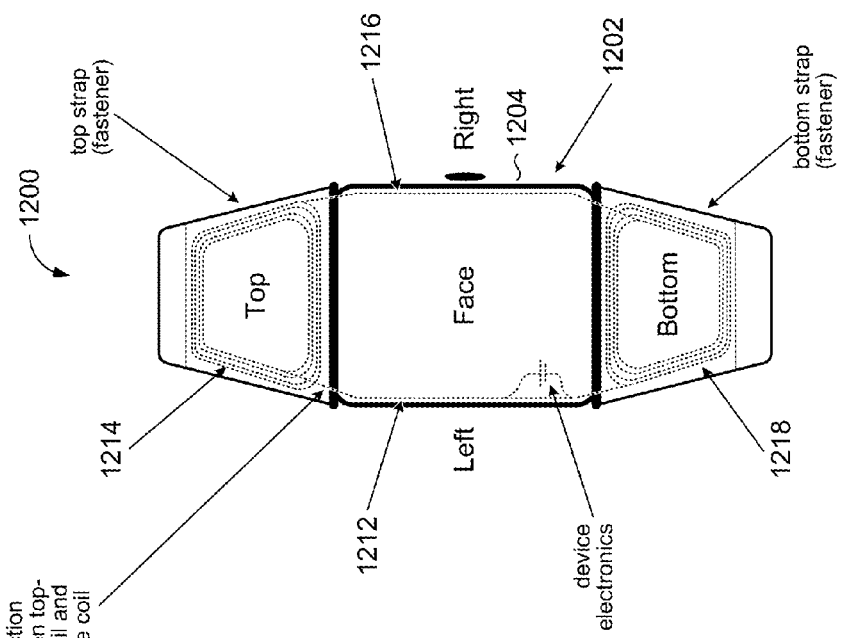
Figure 12B:
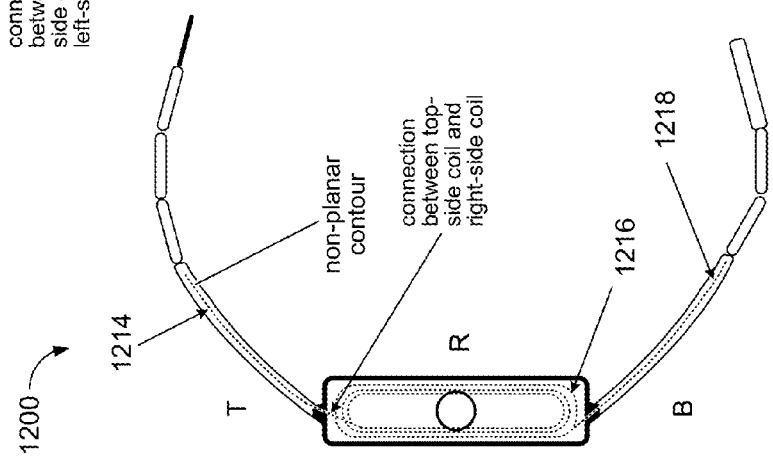

In accordance with the present disclosure, distributed receiving elements in accordance with the present disclosure are not limited to the back covers of an electronic device. Referring to FIGS. 12A, 12B, and 12C, in some embodiments, receiving elements may be distributed in various components of wearable electronic devices (e.g., smartwatch) for wireless power transfer; e.g., within the body of the wearable device, within the wristband, etc. In some embodiments, the distributed receiving elements may not be co-planar relative to each other. The planes in which the receiving elements lie may be at different angles relative to each other. Stated more generally, consider the X-, Y-, and Z-axes of a coordinate system. In accordance with the present disclosure, some of the receiving elements may lie along planes that are parallel to one of the axes, and some of the receiving elements may lie along planes that intersect two or more of the axes.

Further in accordance with the present disclosure, a receiving element may be disposed on a flexible substrate. For example, a receiving element may be curved to fit on the curved portion of the wrist band of a smartwatch. More generally, a receiving element may be folded or curved in two or three dimensions. Accordingly, a receiving element may not necessarily lie flat on a plane.

FIG. 12A represents an illustrative embodiment of a wearable device 1200 that may incorporate a PRU in accordance with the present disclosure. The wearable device 1200 may be a digital watch, an electronic fitness monitoring device that can be worn like a watch, an electronic bracelet, an electronic badge, and so on. The wearable device 1200 may include a device body 1202, which contains components of the wearable device, including for example, device electronics (e.g., processor, controllers, communications, etc.), a display, power electronics (e.g., battery charger, power management unit, etc.), and so on. Fasteners may be provided to allow the user to fasten the wearable device to themselves. A watch, for example, may include straps that allow the user to fasten the watch to their wrist. A badge may include a clip of other suitable mechanism that allows the user to fasten the badge to their clothing.

FIG. 12A establishes some points of reference used in the present disclosure. Facing the device body 1202, there is a right side of the wearable device 1200 and a left side of the wearable device 1200. A top side of the wearable device 1200 refers to a portion of the top fastener (e.g., strap) that is attached at the top of the device body 1202. A bottom side of the wearable device 1200 refers to a portion of the bottom fastener that is attached at the bottom of the device body 1202. The straps may be any suitable construction; e.g., linked segments (as shown in the figurers), flexible band, and so on.

In accordance with some embodiments of the present disclosure, a PRU in the wearable device 1200 may comprise several receiving elements 1212, 1214, 1216, 1218 affixed to the wearable device. In some embodiments, the receiving elements 1212, 1214, 1216, 1218 may be incorporated within the components of the wearable device 1200. For example, FIG. 12A shows that a top-side receiving element 1214 may be incorporated in a portion of the top fastener. The top-side receiving element 1214 is represented by dotted lines to indicate that it may be embedded within the material of the top strap. The right-side view of FIG. 12B indicates this more clearly. Similarly, a bottom-side receiving element 1218 may be incorporated in a portion of the bottom fastener. In other embodiments, the top-side receiving element 1214 and bottom-side receiving element 1218 may be affixed on the surface using an adhesive. The receiving elements 1212, 1214, 1216, 1218 may be formed of any suitable electrically conductive material such as, but not limited to, copper wire, traces patterned on flexible substrates, combinations thereof, and so on.

In accordance with some embodiments of the present disclosure, one or more receiving elements may be affixed to the device body 1202 of the wearable device 1200. For example, the device body 1202 may contain a right-side receiving element 1216 and a left-side receiving element 1212. In some embodiments, the right-side receiving element 1216 and left-side receiving element 1212 may be affixed to respective inside surfaces of the housing 1204 of the device body 1202. FIG. 12B illustrates more clearly the right-side receiving element 1216 disposed within the device body 1202. The left-side view of FIG. 12C, likewise, illustrates the left-side receiving element 1212 disposed within the device body 1202.

In some embodiments, the receiving elements 1212, 1214, 1216, 1218 may be connected together in series. Referring to FIGS. 12A and 12C, for example, one end of the winding comprising the top-side receiving element 1214 may connect to one end of the winding comprising the left-side receiving element 1212. The other end of the left-side receiving element 1212 may connect to the bottom-side receiving element 1218, as can be seen FIGS. 12C and 12A. The series connection may continue with the bottom-side receiving element 1218 connected to the right side receiving element 1216, as shown in FIGS. 12A and 12B, and the right-side receiving element 1216 may connect to the other end of the top-side receiving element 1214 as shown in FIGS. 12A and 12B.

In accordance with the present disclosure, a switching network may selectively switch together different combinations of receiving elements. In some embodiments, the switching network may comprise a plurality of switches connected to a combining circuit. The switches may be selectively opened and closed to connect/disconnect receiving elements with the combining circuit. Selected receiving elements may be combined by the combining circuit.

FIG. 13, for example, shows several receiving elements connected to respective switches 1304. The receiving elements, for example, may be coils (e.g., 502-506, FIG. 5), electrically conductive segments (e.g., 602-606, FIG. 6), combinations thereof, and so on at different locations on the device (not shown). A controller 1306 may operate individual switches 1304 to connect a subset comprising one or more respective receiving elements to a mutual inductance combining circuit 1302. The switches 1304 and mutual inductance combining circuit 1302 may be configured as a means for combining. In some embodiments, the mutual inductance combining circuit 1302 may combine the receiving elements connected to it to additively (series fashion) and/or subtractively (parallel/shunt fashion) combine the mutual inductances so that the set of connected receiving elements has a given total mutual inductance. In some embodiments, the mutual inductance combining circuit 1302 may comprise a matrix of switches. The mutual inductance combining circuit 1302 may be connected to a rectifier to AC rectify the output of combining circuit 1302 to provide a suitable DC level to the load.

In operation, the receiving elements may couple to an externally generated magnetic field. The switches 1304 may select a subset of the receiving elements that the combiner 1302 may connect together to combine current induced in the subset of receiving elements to produce power for the device. In some embodiments, the combined current may be rectified.

Referring to FIG. 14, in some embodiments, the receiving elements may be connected to respective rectifiers. A subset comprising one or more of the outputs of rectifiers may be selectively connected to a voltage combining circuit 1402 by way of switches 1404. A controller 1406 may control switches 1404 to connect different combinations of rectifiers to the voltage combining circuit 1402. The switches 1404 and mutual inductance combining circuit 1402 may be configured as a means for combining. The controller 1406 may control the voltage combining circuit 1402 to add and/or subtract the various voltages connected to it so that the set of connected receiving elements can provide a given total voltage at the output of the voltage combining circuit 1402. In some embodiments, the voltage combining circuit 1402 may comprise a matrix of switches.

Figure 15:
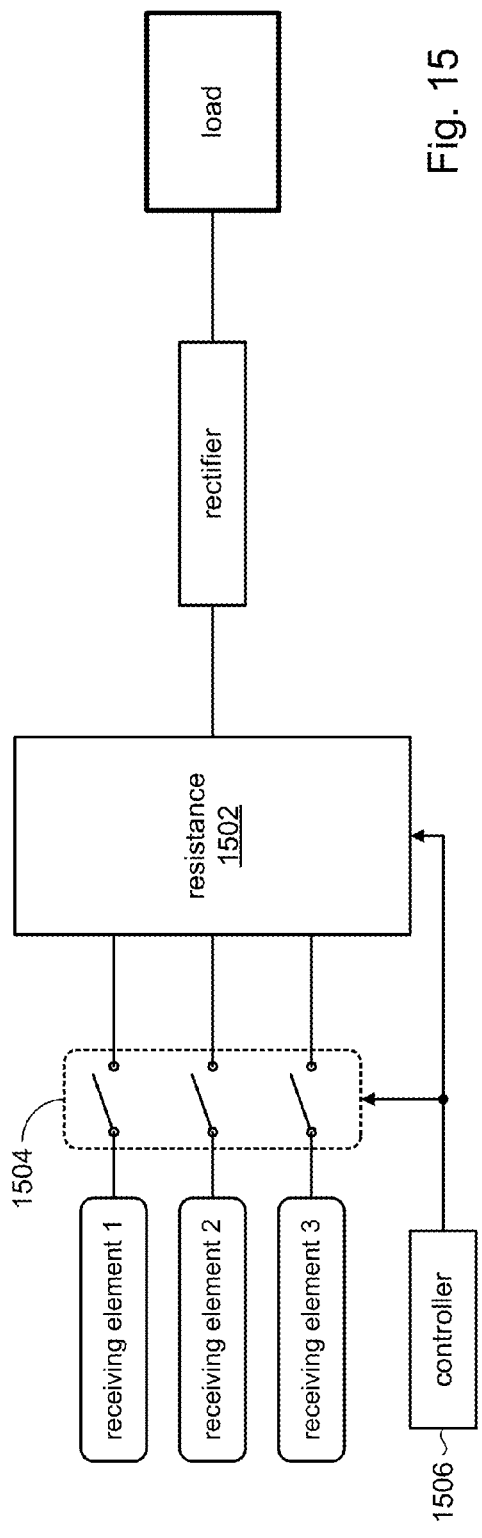
FIG. 15 illustrates selectively connectable combinations of receiving elements based on resistance in accordance with the present disclosure.

Referring to FIG. 15, in some embodiments, the receiving elements may be connected to a resistance combining circuit 1502 by way of switches 1504. A controller 1506 may operate switches 1504 to connect a subset comprising one or more respective receiving elements to the resistance combining circuit 1502. The switches 1504 and mutual inductance combining circuit 1502 may be configured as a means for combining. In some embodiments, the resistance combining circuit 1502 may combine the resistances of the receiving elements connected to it to additively (series fashion) and/or subtractively (parallel fashion) combine the resistances, for example, to increase power efficiency of the receiving elements. In some embodiments, the resistance combining circuit 1502 may comprise a matrix of switches.

Figure 16:
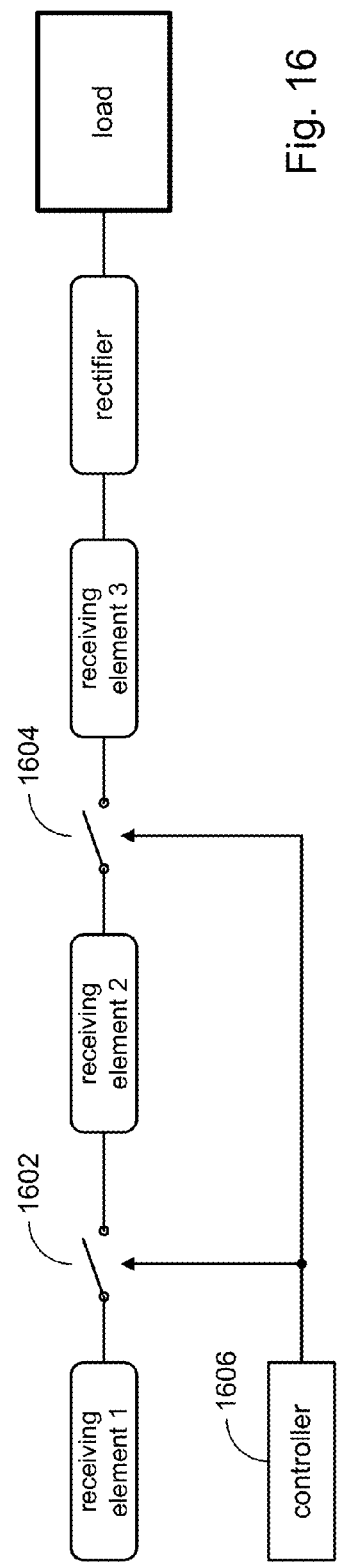
FIG. 16 illustrates selectively connectable combinations of receiving elements in accordance with the present disclosure.

In some embodiments, the receiving elements may be connected in a series switching configuration. FIG. 16, for example, shows a series-connected configuration comprising switches 1602, 1604 connected between pairs of receiving elements, which may be configured as a means for combining A controller 1606 may operate the switches 1602, 1604 to achieve a desired mutual inductance.

Figure 17:
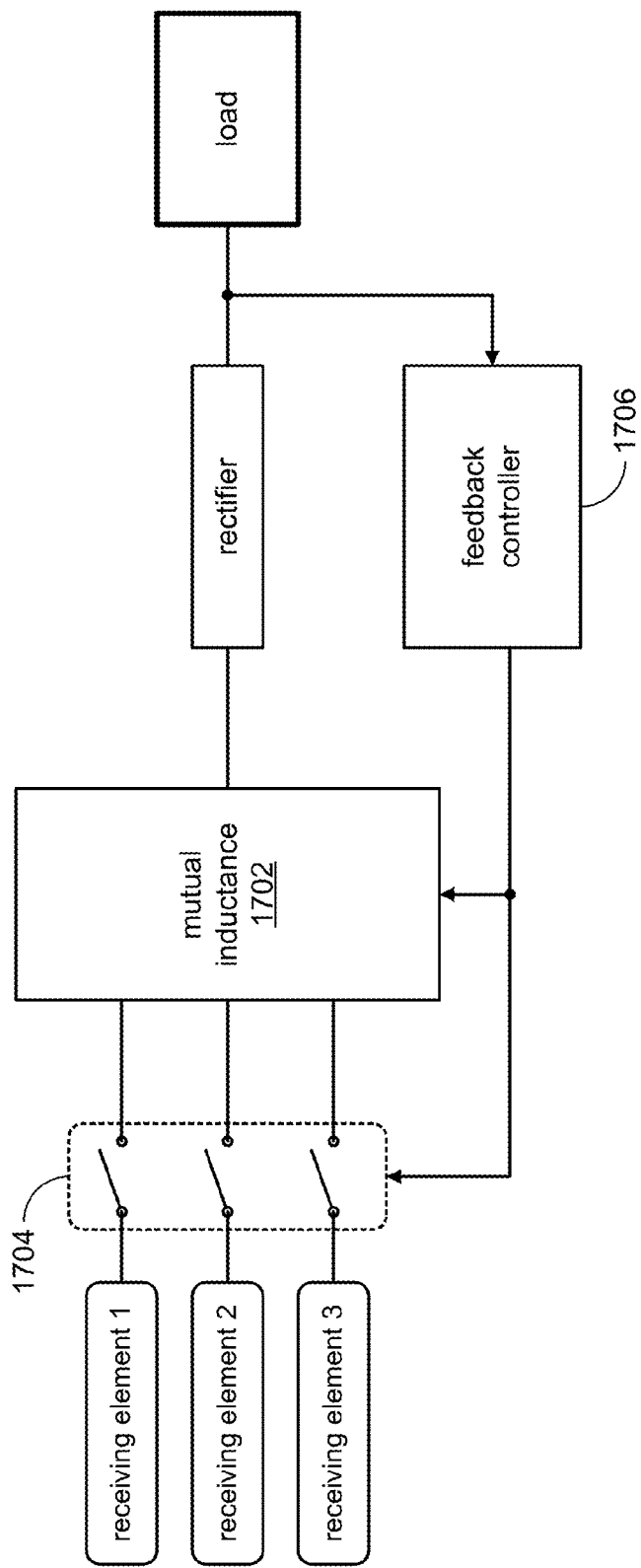
FIG. 17 illustrates selectively connectable combinations of receiving elements using feedback in accordance with the present disclosure.

In some embodiments, a feedback path may be used to control selective switching. FIG. 17, for example, shows receiving elements connected to switches 1704. A feedback controller 1706 may selectively control switches 1704 to connect a subset comprising one or more receiving elements to a mutual inductance combining circuit 1702. The switches 1704 and mutual inductance combining circuit 1702 may be configured as a means for combining. The controller 1706 may use the voltage level generated by the rectifier as a feedback signal to control the connection and disconnection of the receiving elements to the mutual inductance combining circuit 1702. The controller 1706 may further use the voltage level to control how receiving elements connected to the mutual inductance combining circuit 1702 are combined, namely additively, subtractively, combination of both. For example, the controller 1706 may use feedback control to maintain a desired voltage level by connecting various receiving elements to the mutual inductance combining circuit 1702 and controlling how those receiving elements are combined.

In accordance with the above, in an embodiment, a method is provided for wirelessly receiving power. The method includes producing a first current through electromagnetic induction at a first location in a device. The method further includes producing a second current through electromagnetic induction at a second location in the device. The method further includes combining the first current and the second current to produce power for the device. In some embodiments, producing a first current may include coupling a first power receiving element to an externally generated magnetic field and producing a second current includes coupling a second power receiving element to the externally generated magnetic field. In some embodiments, producing a first current includes coupling a first coil of wire to the externally generated magnetic field and producing a second current includes coupling a portion of a metallic casing that houses the device to the externally generated magnetic field.

In another embodiment, another method for wirelessly receiving power is provided. The method includes coupling power receiving elements to an externally generated magnetic field at different locations in a device. The method further includes connecting together a subset of the receiving elements. The method further includes combining current induced in the subset of the receiving elements to produce power for the device. In some embodiments, coupling power receiving elements to the externally generated magnetic field includes one or more of coupling a coil of wire to the externally generated magnetic field and coupling a portion of a metallic casing that houses the device to the externally generated magnetic field. In some embodiments, the method further includes rectifying a combined current subsequent to combining the current induced in the subset of the power receiving elements. In some other embodiments, the method further includes rectifying current induced in the subset of the power receiving elements prior to the combining.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

A system of distributed receiving elements in accordance with the present disclosure may exhibit lower resistance as compared to a one-wire solution. The distribution of receiving elements in the casing of a PRU avoids impacting operation of communication antennas, such as antennas used for LTE, WCDMA, GSM, GPS, WiFi, and so on. The configurability of distributed receiving elements avoids design changes in antenna placement.

What is claimed:

1. An apparatus for wireless charging, comprising:
a casing comprising one or more electrically separate, electrically conductive segments; and
a plurality of power receiving elements configured to couple to an externally generated magnetic field to wirelessly power or charge a load, at least one of the plurality of power receiving elements comprising one of the electrically conductive segments of the casing,
at least a first power receiving element and a second power receiving element connected together and operative to produce a single output of power when coupled to the externally generated magnetic field.

2. The apparatus of claim 1, wherein one or more of the plurality of power receiving elements are connected in a resonant circuit.

3. The apparatus of claim 1, wherein at least one of the plurality of power receiving elements comprises a coil of wire.

4. The apparatus of claim 1, wherein the casing comprises a top segment, wherein the first power receiving element comprises a first conductor having at least one turn wound parallel to a first plane of the top segment of the casing and the second power receiving element comprises a second conductor having at least one turn wound parallel to a second plane of a side of the casing and is non-parallel to the first plane.

5. The apparatus of claim 4, wherein the first conductor is affixed to an inside surface of the top segment of the casing and the second conductor is affixed to an inside surface of the side of the casing.

6. The apparatus of claim 1, further comprising a plurality of switches selectively operable to connect together at least some of the plurality of power receiving elements in different combinations of connected power receiving elements.

7. The apparatus of claim 6, wherein the different combinations of connected power receiving elements have different degrees of mutual coupling with the externally generated magnetic field.

8. The apparatus of claim 6, wherein the different combinations of connected power receiving elements provide different output voltages.

9. The apparatus of claim 6, wherein the different combinations of connected power receiving elements have different resistances.

10. The apparatus of claim 6, further comprising a controller to control the plurality of switches.

11. The apparatus of claim 1, further comprising a plurality of rectifiers, each power receiving element connected to a corresponding rectifier, wherein the plurality of rectifiers are connected together in series.

12. The apparatus of claim 1, wherein at least some of the plurality of power receiving elements are connected in series.

13. The apparatus of claim 1, wherein the at least some of the plurality of power receiving elements are connected together so that magnetic fields which arise in the at least some of the plurality of power receiving elements combine constructively.

14. The apparatus of claim 1, wherein the externally generated magnetic field is generated from a source that is vertically spaced apart from the apparatus.

15. The apparatus of claim 1, wherein the externally generated magnetic field is generated from a source that is horizontally spaced apart from the apparatus.

16. The apparatus of claim 1, wherein the casing is configured to house components of a mobile device, wherein the load comprises an electrical component of the mobile device.

17. The apparatus of claim 16, wherein the mobile device is a wearable device.

18. An apparatus for wirelessly receiving power, the apparatus comprising:

a casing that constitutes a portion of a housing of an electronic device, the casing having at least one electrically conductive segment;

a first power receiving element configured to wirelessly receive power via an externally generated alternating magnetic field, the first power receiving element comprising a coil of conductive material attached to the casing; and at least a second power receiving element configured to wirelessly receive power via the externally generated alternating magnetic field, the second power receiving element comprising the at least one electrically conductive segment of the casing.

19. The apparatus of claim 18, wherein the first power receiving element is connected in a resonant circuit.

20. The apparatus of claim 19, wherein the at least second power receiving element is connected in a resonant circuit.

21. The apparatus of claim 18, further comprising an electrical connection between the coil of conductive material that comprises the first power receiving element and the at least one electrically conductive segment of the casing that comprises the second power receiving element.

22. The apparatus of claim 18, wherein the first power receiving element lies in a first plane and the second power receiving element lies in a second plane in non-parallel relation to the first plane.

23. The apparatus of claim 18, wherein the first power receiving element is attached to a side of the casing.

24. The apparatus of claim 18, further comprising:
a plurality of power receiving elements, including the first and second power receiving elements; and
a plurality of switches selectively operable to connect together different combinations of power receiving elements.

25. The apparatus of claim 24, wherein the different combinations of power receiving elements provide different degrees of mutual coupling with the externally generated magnetic field.

26. The apparatus of claim 24, wherein the different combinations of power receiving elements have different mutual inductances.

27. The apparatus of claim 24, wherein the different combinations of power receiving elements provide different output voltages.

28. The apparatus of claim 24, wherein the different combinations of power receiving elements have different resistances.

29. An apparatus for wirelessly receiving power, the apparatus comprising:
means for housing an electronic device including at least one metal segment;
first means for receiving power through an externally generated magnetic field;
second means for receiving power through the externally generated magnetic field comprising a portion of the at least one metal segment.

30. The apparatus of claim 29, either or both the first means and the second means are connected in a resonant circuit.

31. The apparatus of claim 29, further comprising means for connecting together the first means and the second means.

32. A method for wirelessly receiving power comprising:
producing a first current through electromagnetic induction at a first location in a device;
producing a second current through electromagnetic induction at a second location in the device; and
combining the first current and the second current to produce power for the device;
wherein producing a first current includes coupling a first coil of wire to an externally generated magnetic field and producing a second current includes coupling a portion of a metallic casing that houses the device to the externally generated magnetic field.

33. An apparatus for wirelessly receiving power, the apparatus comprising:
a casing for a portable electronic device;
a plurality of power receiving elements distributed at different locations on the casing;
a combining circuit;
a plurality of switches configured to connect a subset of the plurality of power receiving elements to the combining circuit, the combining circuit configured to combine the subset of the plurality of power receiving elements to form a set of connected power receiving elements; and
a controller configured to operate the plurality of switches and the combining circuit.

34. The apparatus of claim 33, wherein one or more of the plurality of power receiving elements is connected in a resonant circuit.

35. The apparatus of claim 33, further comprising a rectifier circuit connected to an output of the combining circuit to produce an output voltage.

36. The apparatus of claim 33, wherein the combining circuit is configured to selectively connect together the subset of the plurality of power receiving elements in series fashion and/or in parallel fashion.

37. The apparatus of claim 33, further comprising a plurality of rectifier circuits connected to respective power receiving elements in the plurality of power receiving elements to output respective DC levels, outputs of the rectifier circuits connected to the combining circuit.

38. The apparatus of claim 37, wherein the combining circuit is configured to selectively add and/or subtract DC levels associated with the subset of power receiving elements.

39. A method for wirelessly receiving power, comprising:
coupling power receiving elements to an externally generated magnetic field at different locations in a device;
connecting together a subset of the receiving elements; and
combining current induced in the subset of the receiving elements to produce power for the device;
wherein coupling power receiving elements to the externally generated magnetic field includes one or more of coupling a coil of wire to the externally generated magnetic field and coupling a portion of a metallic casing that houses the device to the externally generated magnetic field.

40. The method of claim 39, further comprising rectifying a combined current subsequent to combining the current induced in the subset of the power receiving elements.

41. The method of claim 39, further comprising rectifying current induced in the subset of the power receiving elements prior to the combining.

* * * * *